United States Patent
Michaelides et al.

(10) Patent No.: US 10,224,767 B2
(45) Date of Patent: Mar. 5, 2019

(54) ELECTRIC MACHINE AND METHOD OF OPERATION THEREOF

(71) Applicant: Jaguar Land Rover Limited, Coventry (GB)

(72) Inventors: Alexandros Michaelides, Coventry (GB); Xavier Vinamata, Coventry (GB); Jose Soler, Coventry (GB)

(73) Assignee: Jaguar Land Rover Limited, Coventry, Warwickshire (GB)

( * ) Notice: Subject to any disclaimer, the term of this patent is extended or adjusted under 35 U.S.C. 154(b) by 281 days.

(21) Appl. No.: 14/443,139

(22) PCT Filed: Nov. 20, 2013

(86) PCT No.: PCT/EP2013/074280
§ 371 (c)(1),
(2) Date: May 15, 2015

(87) PCT Pub. No.: WO2014/079881
PCT Pub. Date: May 30, 2014

(65) Prior Publication Data
US 2015/0295456 A1    Oct. 15, 2015

(30) Foreign Application Priority Data

Nov. 20, 2012  (GB) .................................. 1220816.1
Mar. 1, 2013   (GB) .................................. 1303653.8
(Continued)

(51) Int. Cl.
*H02K 1/16*    (2006.01)
*H02K 1/27*    (2006.01)
(Continued)

(52) U.S. Cl.
CPC ............... *H02K 1/16* (2013.01); *H02K 1/148* (2013.01); *H02K 1/274* (2013.01); *H02K 11/01* (2016.01);
(Continued)

(58) Field of Classification Search
CPC ............ H02K 1/12; H02K 1/14–1/148; H02K 1/16–1/165; H02K 1/18; H02K 5/04; H02K 5/26
(Continued)

(56) References Cited

U.S. PATENT DOCUMENTS 4,315,171 A * 2/1982 Schaeffer ............... H02K 37/14
                                                310/216.109
4,584,513 A   4/1986 Freise et al.
(Continued)

FOREIGN PATENT DOCUMENTS

CN      101610007 A    12/2009
DE   102009009073 A1    8/2010
(Continued)

*Primary Examiner* — Thomas Truong
(74) *Attorney, Agent, or Firm* — Myers Bigel, P.A.

(57) ABSTRACT

In one aspect of the invention for which protection is sought there is provided an electric machine comprising a substantially circular rotor and a stator, wherein the stator comprises at least one substantially arcuate segment. Aspects of the invention also relate to a stator segment comprising at least one inter-pole shield disposed between adjacent teeth. Further aspects of the invention also relate to a stator segment having a first shield disposed at a first circumferential end thereof and/or a second shield disposed at a second circumferential end thereof. Aspects of the invention also relate to a stator segment having a radially outwardly directed protuberance.

18 Claims, 15 Drawing Sheets

DSPM Machine with segmented stator

(30) Foreign Application Priority Data

Sep. 30, 2013 (GB) .................................. 1317305.9
Sep. 30, 2013 (GB) .................................. 1317309.1

(51) Int. Cl.

| | | |
|---|---|---|
| *H02K 1/24* | (2006.01) | |
| *H02K 21/16* | (2006.01) | |
| *H02K 41/03* | (2006.01) | |
| *H02K 19/10* | (2006.01) | |
| *H02K 1/14* | (2006.01) | |
| *H02K 11/01* | (2016.01) | |
| *H02K 7/00* | (2006.01) | |

(52) U.S. Cl.
CPC ........... *H02K 19/103* (2013.01); *H02K 21/16* (2013.01); *H02K 41/03* (2013.01); *H02K 41/031* (2013.01); *H02K 1/24* (2013.01); *H02K 7/006* (2013.01); *H02K 2201/15* (2013.01); *H02K 2213/12* (2013.01)

(58) Field of Classification Search
USPC .... 310/216.008, 216.015, 216.016, 216.031, 310/216.032
IPC ........................................ H02K 1/12, 1/14, 1/16
See application file for complete search history.

(56) References Cited

U.S. PATENT DOCUMENTS

| | | | | |
|---|---|---|---|---|
| 5,672,925 A * | 9/1997 | Lipo | ..................... | H02K 19/103 310/154.11 |
| 6,121,711 A | 9/2000 | Nakahara et al. | | |
| 6,265,804 B1 * | 7/2001 | Nitta | ..................... | H02K 1/148 310/193 |
| 2002/0008434 A1 * | 1/2002 | Akutsu | ..................... | H02K 1/00 310/216.003 |
| 2004/0217669 A1 * | 11/2004 | Fujii | ..................... | H02K 1/148 310/216.045 |
| 2004/0245872 A1 * | 12/2004 | Eppler | ..................... | H02K 5/08 310/89 |
| 2008/0100159 A1 | 5/2008 | Dawsey et al. | | |
| 2008/0211326 A1 | 9/2008 | Kang et al. | | |
| 2009/0072647 A1 * | 3/2009 | Hino | ..................... | B60L 3/0061 310/156.15 |
| 2009/0323208 A1 | 12/2009 | Kurosawa | | |
| 2010/0253178 A1 | 10/2010 | Koyama et al. | | |
| 2011/0031824 A1 | 2/2011 | Prudham | | |
| 2011/0169351 A1 * | 7/2011 | Hessenberger | ........ | H02K 1/141 310/50 |
| 2012/0074797 A1 * | 3/2012 | Petter | ..................... | H02K 21/16 310/51 |
| 2012/0074798 A1 * | 3/2012 | Bywaters | ................. | H02K 1/16 310/54 |
| 2012/0248928 A1 | 10/2012 | Hashimoto et al. | | |
| 2012/0267974 A1 | 10/2012 | Lebenbom | | |
| 2013/0200746 A1 * | 8/2013 | Foulsham | ............. | H02K 1/148 310/216.007 |

FOREIGN PATENT DOCUMENTS

| | | | | |
|---|---|---|---|---|
| EP | 1 351 367 A1 | 10/2003 | | |
| EP | 2 385 609 A1 | 11/2011 | | |
| GB | 385 899 A | 1/1933 | | |
| GB | 2 276 771 A | 5/1994 | | |
| GB | 2475732 A * | 6/2011 | ............. | H02K 1/148 |
| GB | 2 511 353 A | 9/2014 | | |
| JP | H1146462 A | 2/1999 | | |
| JP | 2002252950 A | 9/2002 | | |
| JP | 2004328966 A | 11/2004 | | |
| JP | 2007181292 A | 7/2007 | | |
| JP | 2007330025 A | 12/2007 | | |
| JP | 2011004481 A | 1/2011 | | |
| JP | 2011066991 A | 3/2011 | | |
| WO | WO 91/14876 | 10/1991 | | |
| WO | WO 01/48890 A1 | 7/2001 | | |
| WO | WO 2005/099064 A1 | 10/2005 | | |
| WO | WO 2006/100548 A1 | 9/2006 | | |
| WO | WO 2011/125199 A1 | 10/2011 | | |

* cited by examiner

Figure 1. SR Machine with complete stator

Figure 2. Segmentation process

Figure 3. SR Machine with segmented stator

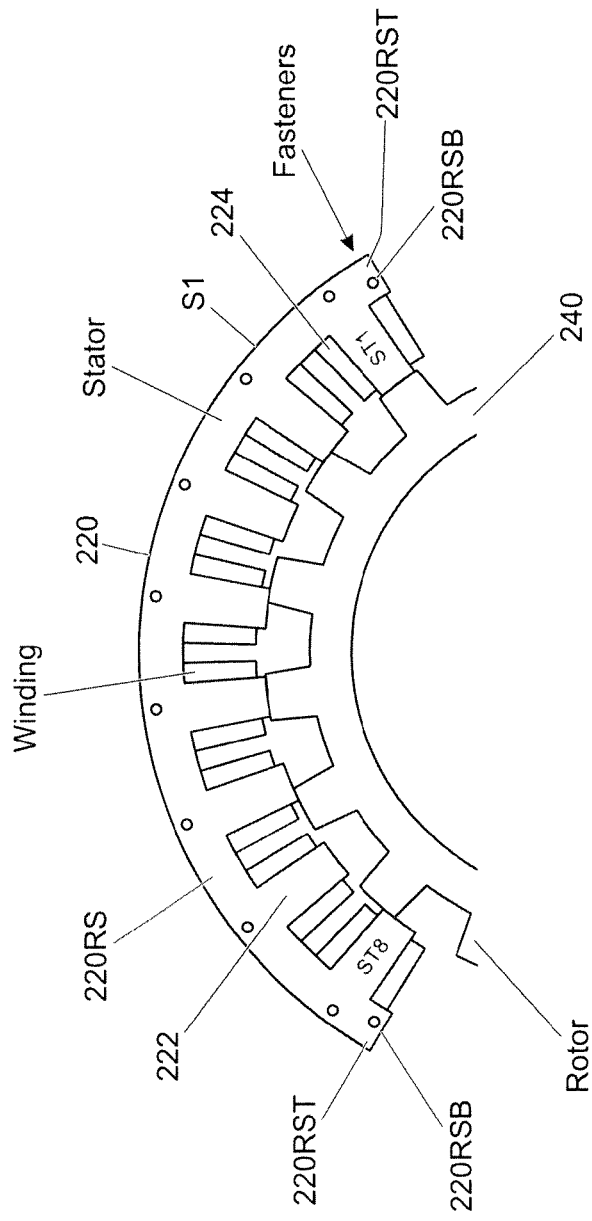
Figure 5. Segmented stator fastening

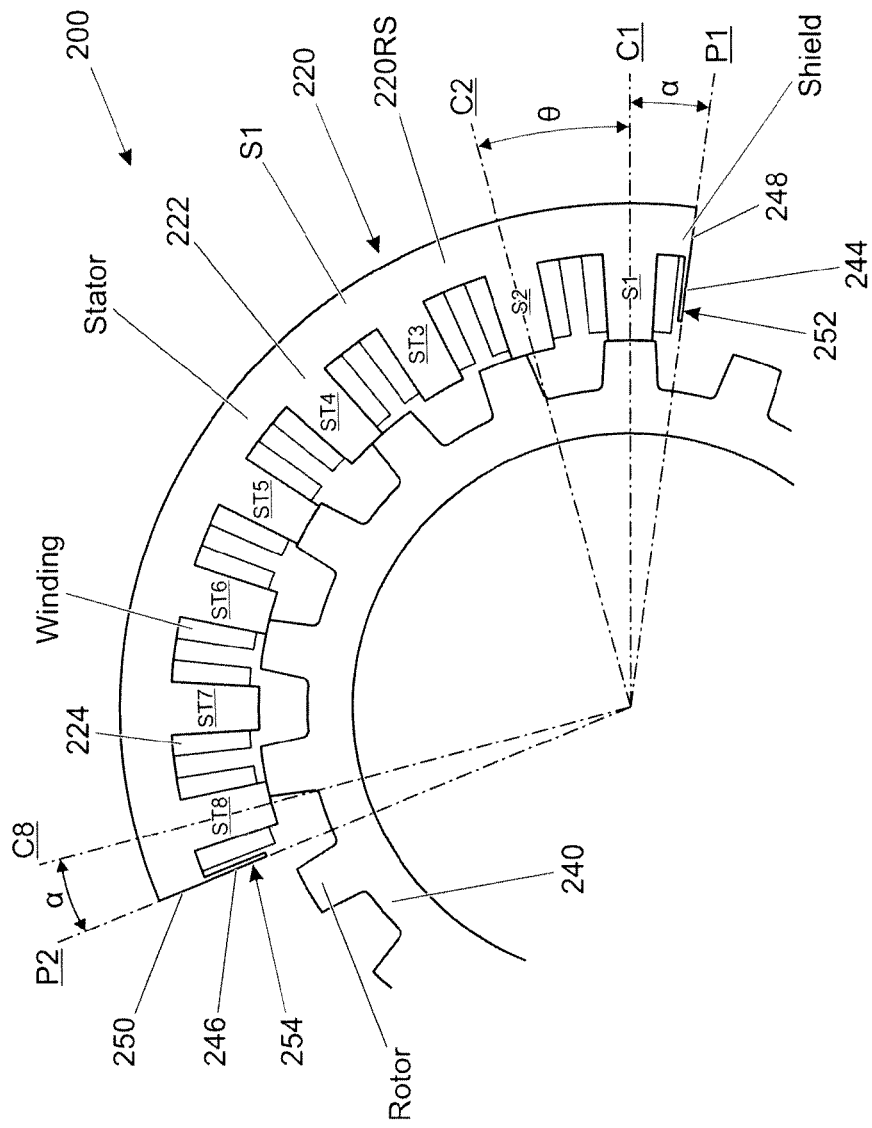
Figure 6. SR Machine with segmented stator and shields

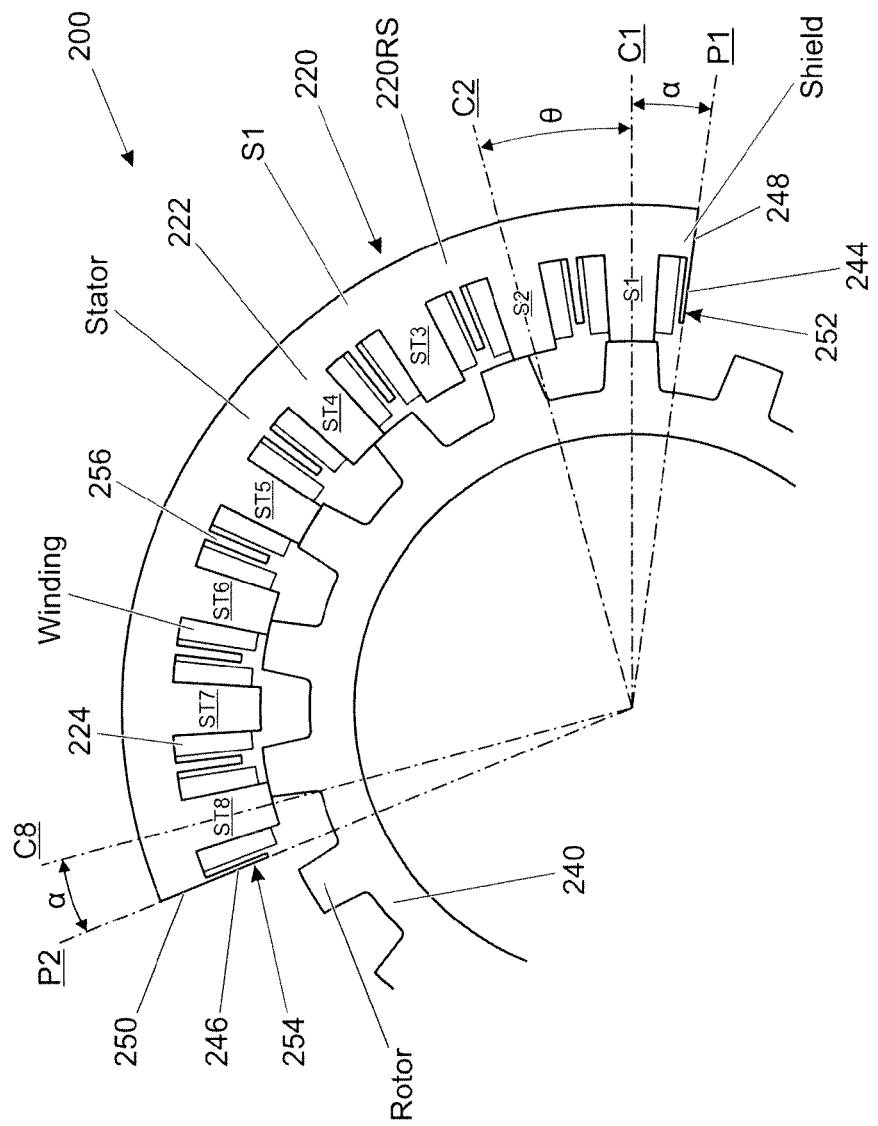
Figure 7. SR Machine with segmented stator and shields

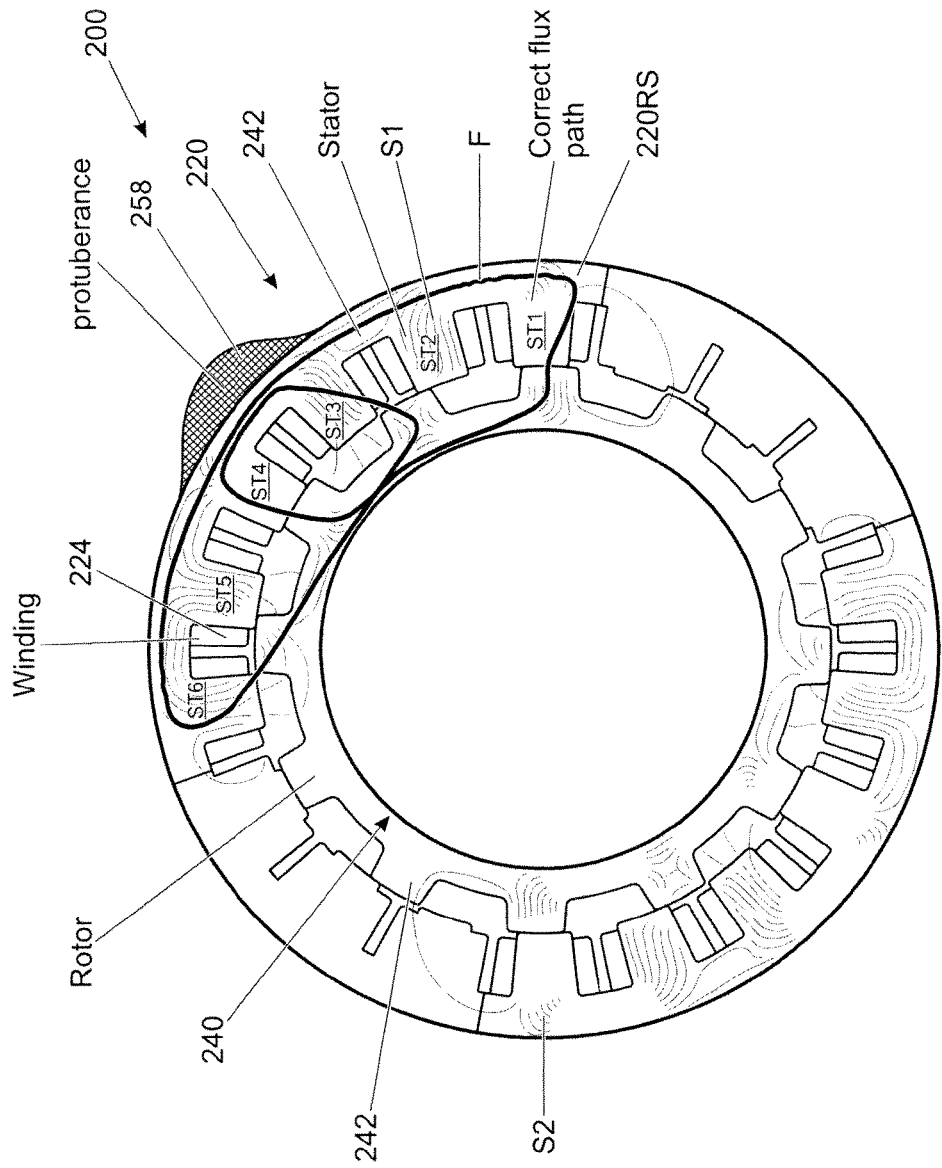
Figure 8. SR Machine with segmented stator and protuberance

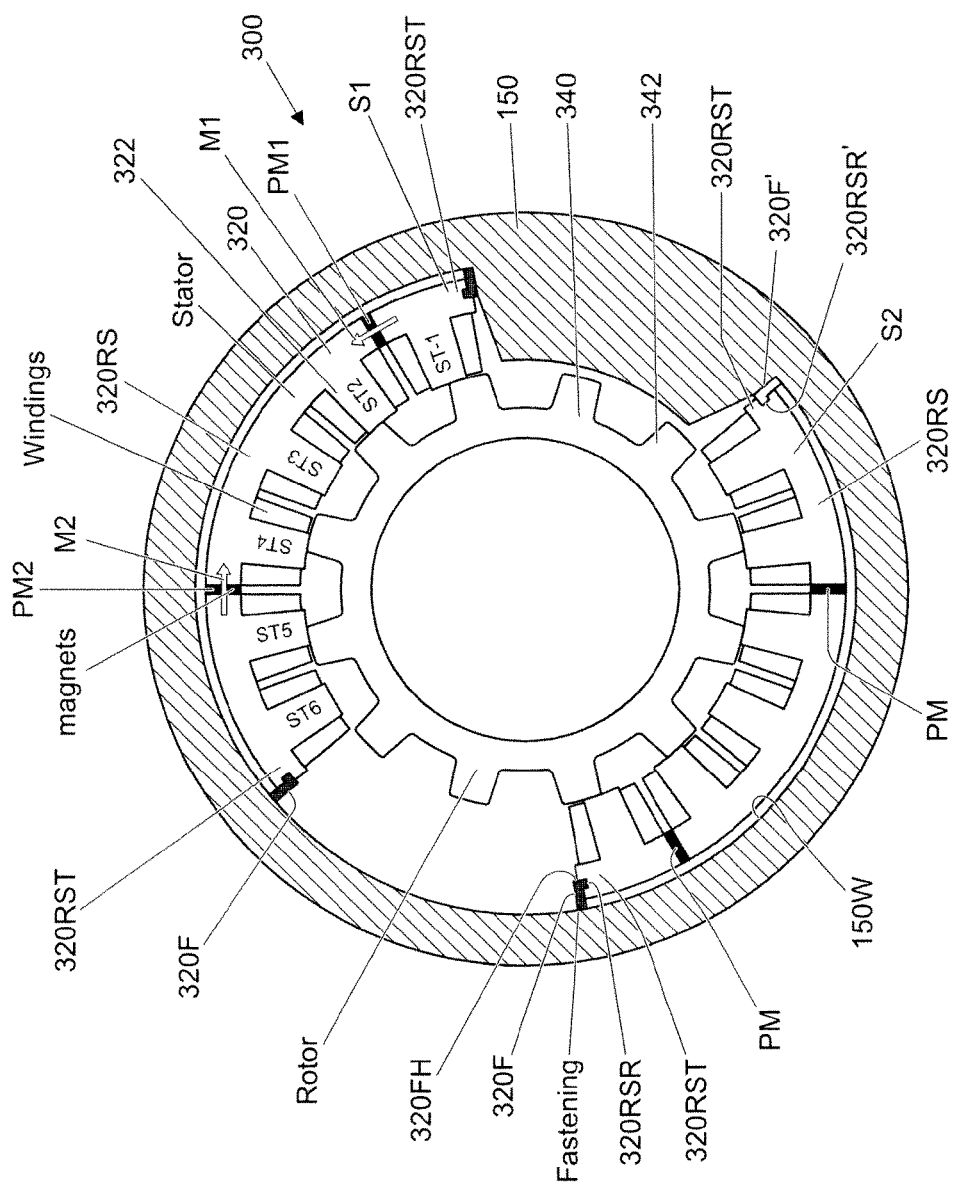
Figure 9A. DSPM Machine with segmented stator

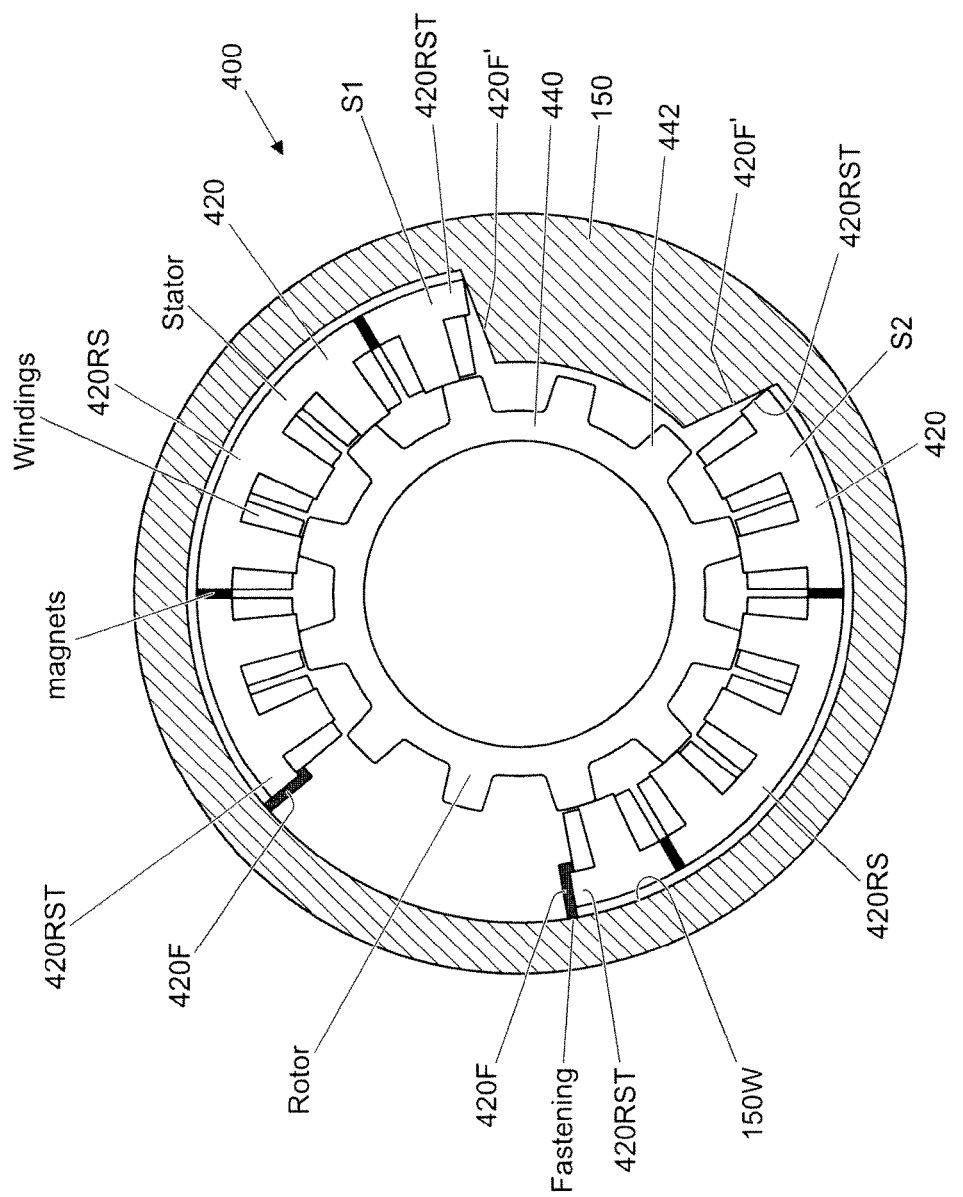
Figure 9B. DSPM Machine with segmented stator

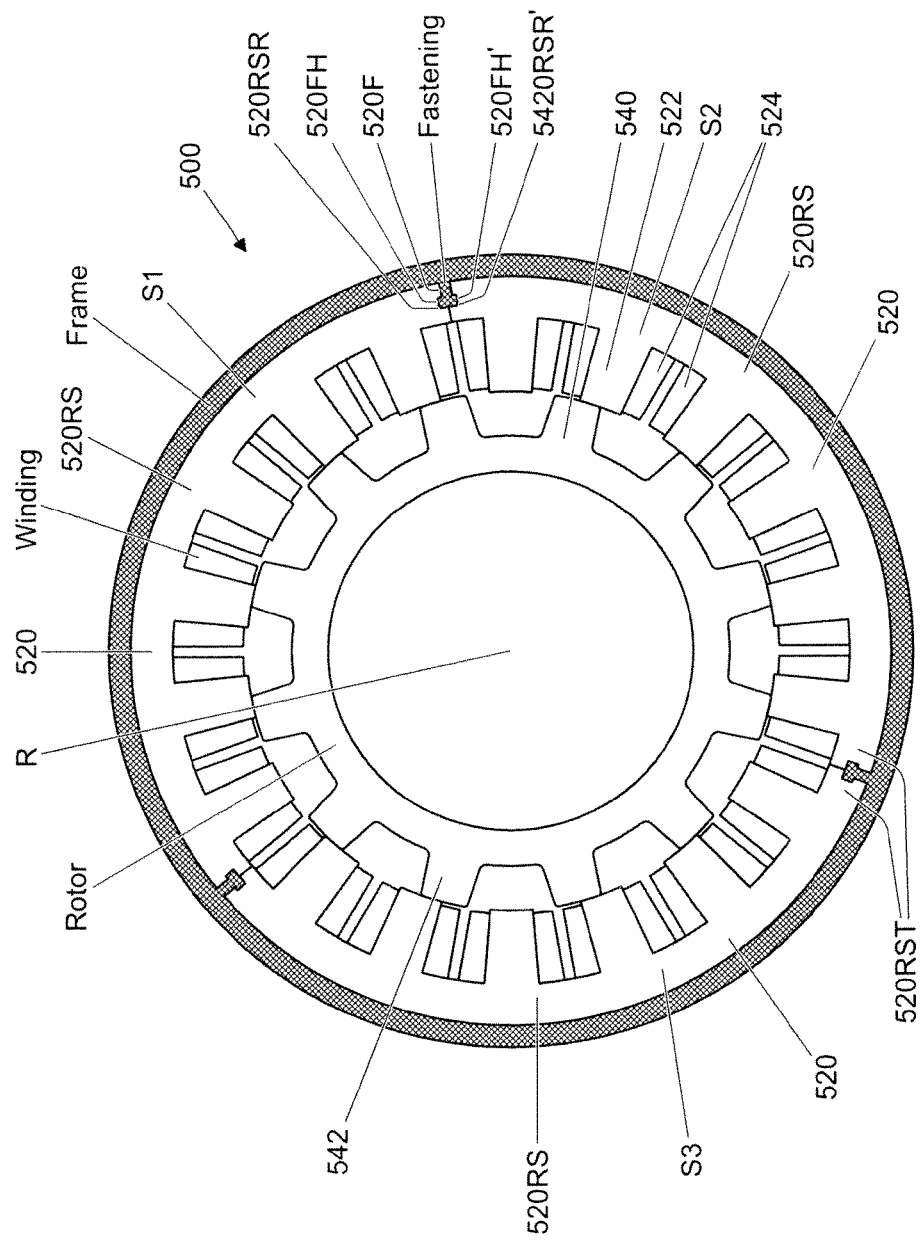
Figure 10. SR Machine composed of 3 sectors

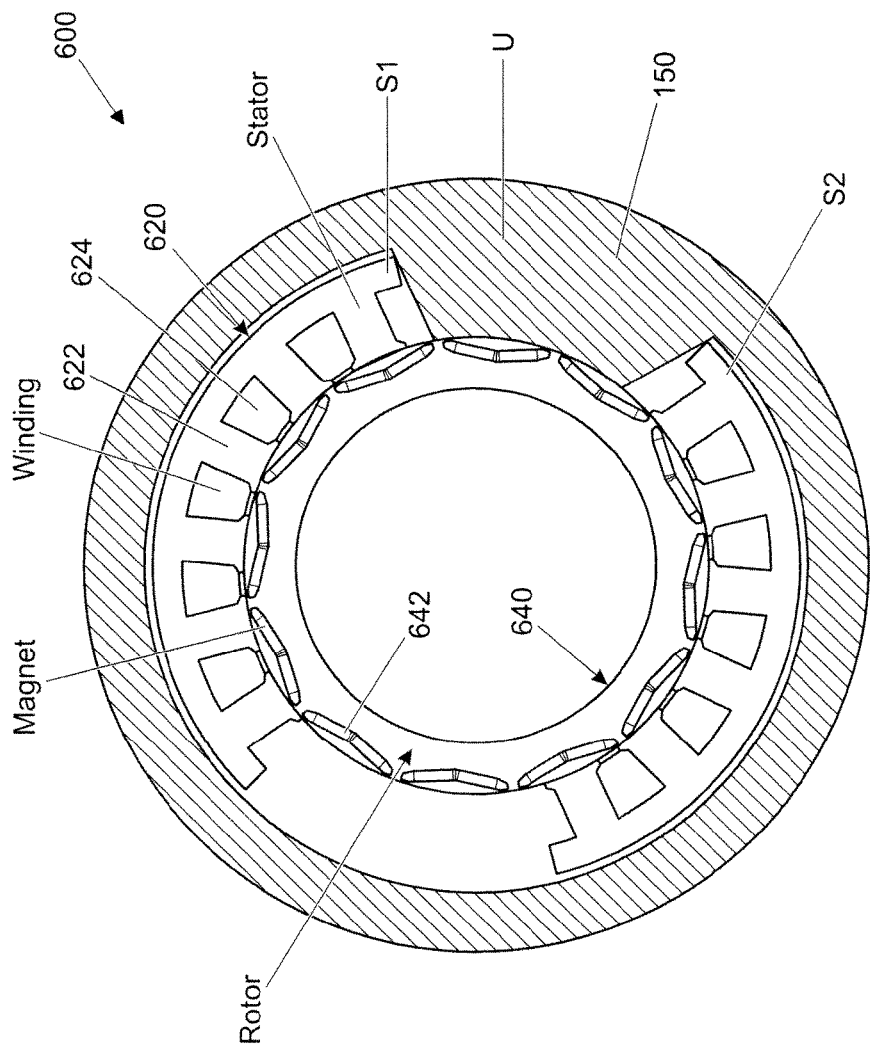
Figure 11. PM Machine with segmented stator

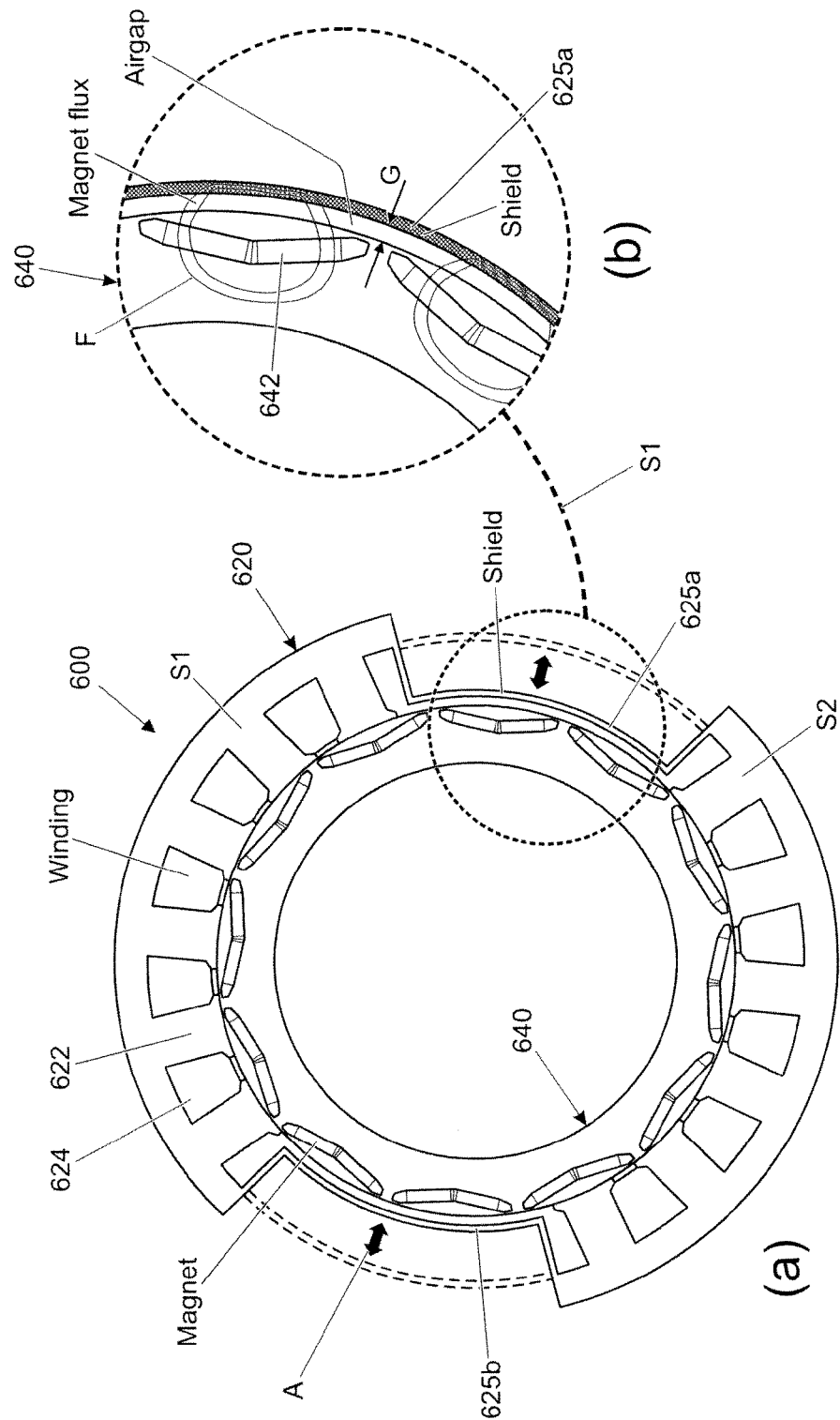
Figure 12. PM Machine with segmented stator and shield stamped from the stator lamination

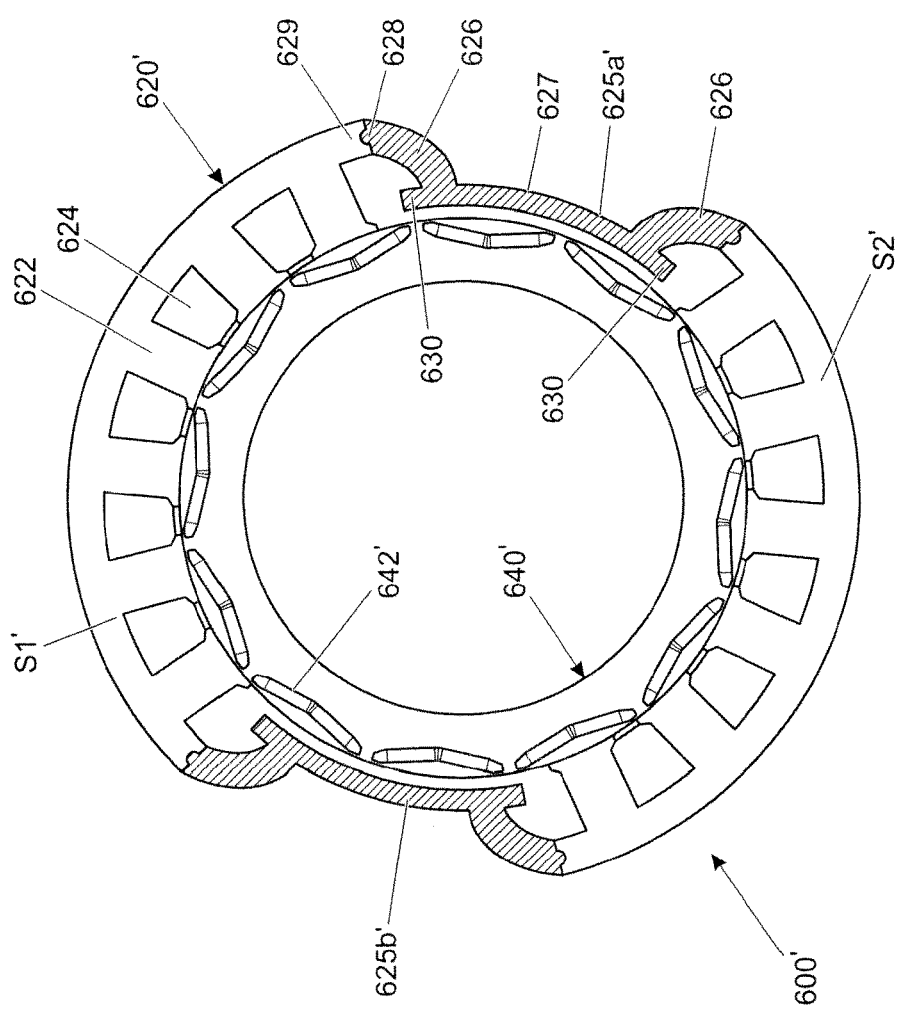
Figure 13. PM Machine with segment stator and independent shield

ELECTRIC MACHINE AND METHOD OF OPERATION THEREOF

RELATED APPLICATIONS

This application is a 35 U.S.C. § 371 national stage application of PCT Application No. PCT/EP2013/074280, filed on Nov. 20, 2013, which claims priority from Great Britain Patent Application No. 1220816.1, filed on Nov. 20, 2012, Great Britain Patent Application No. 1303653.8, filed on Mar. 1, 2013, Great Britain Patent Application No. 1317309.1, filed on Sep. 30, 2013, and Great Britain Patent Application No. 1317305.9, filed on Sep. 30, 2013, the contents of which are incorporated herein by reference in their entireties. The above-referenced PCT International Application was published in the English language as International Publication No. WO 2014/079881 A2 on May 30, 2014.

TECHNICAL FIELD

The present invention relates to electric machines. In particular but not exclusively the invention relates to electric machines for use as propulsion motors and/or generators for motor vehicles. Aspects of the invention relate to an electric machine, to a method, to an arcuate segment, to a shield element, to a stator for an electrical machine and to a vehicle.

BACKGROUND

It is known to provide an electric machine having a substantially circular stator and a coaxial rotor rotatably mounted within the stator. A wide variety of designs are known including the switched reluctance motor (SRM), permanent magnet synchronous motor (PMSM), doubly salient permanent magnet (DSPM) motor, induction motor and wound field motor. The DSPM motor is a SRM motor incorporating permanent magnets (PMs) into the switched reluctance structure.

SRM-type motors are of particular interest for use in electric vehicles (EVs) and hybrid electric vehicles (HEVs) due to good power density, robustness, fault tolerance and relatively low cost compared with permanent magnet (PM) machines.

It is desirable to provide improved electric machines for use in motor vehicles as propulsion motors, generators or combined motor/generators.

SUMMARY OF THE INVENTION

Aspects of the present invention provide an electric machine, a vehicle, a method, an arcuate segment, a shield element, and a stator for an electrical machine as claimed in the appended claims. The electric machine can be a switched reluctance electric machine or a permanent magnet electric machine.

In one aspect of the invention for which protection is sought there is provided an electric machine comprising a substantially circular rotor and a stator, wherein the stator comprises at least one substantially arcuate segment.

At least in certain embodiments, each arcuate segment can take the form of a separate module which is assembled independently. The arcuate segments can be assembled separately and, at least in certain embodiments, a plurality of the assembled arcuate segments can then be joined together to form the stator. The modular arrangement of the arcuate segments can, at least in certain embodiments, allow like arcuate segments to be assembled to form either a circular (continuous) or non-circular (discontinuous) stator. The arcuate segments can each comprise a plurality of sheet elements arranged in face-to-face arrangement and one or more windings applied to one or more teeth defined by said sheet elements.

The arcuate segments can, for example, each be provided with inter-engaging (mating) connectors for coupling like arcuate segments together. The connectors can provide radial support for the stator segments to inhibit relative movement between the rotor and stator without causing substantial disturbance to or disruption of the flow of magnetic flux through the stator. The connectors can be configured to enable the arcuate segments to move longitudinally relative to each other (i.e. substantially parallel to the longitudinal axis of the stator) to enable them to be coupled together. Thus, the assembled arcuate segments can be slotted together action.

The connectors can extend intermittently or continuously along the length of each arcuate segment. The connectors can have a substantially uniform profile. The connectors can, for example, form a dove-tail coupling, or a tongue and groove coupling.

In an embodiment, the at least one substantially arcuate segment defines, at least in part, a discontinuous ring or annulus.

The stator may still be substantially circular but comprise a plurality of segments. The number of segments required to define a complete circle will depend on the angle subtended by each segment comprising the stator. Embodiments of the invention have the advantage that an electric machine may be provided that is formed from modular components. Thus, a designer has a flexibility to design a plurality of motors having differently shaped stators and different power ratings made from similar segment components, eliminating the requirement to provide stator components having different shapes (such as circular and non-circular) in some arrangements.

By substantially arcuate segment is meant that a surface of the segment facing the stator is substantially arcuate. The stator may have radially inner and radially outer surfaces that are substantially arcuate in some embodiments such as that illustrated in FIG. 3 and described in detail below.

Advantageously the stator may be substantially non-circular. By non-circular is meant that the stator does not describe a substantially complete circle. In other words, the stator may be discontinuous or interrupted. Whilst the stator describes one or more portions of a circle, it does not describe a full circle. It is to be understood that the stator may be comprised of a plurality of segments.

Embodiments of the present invention have the advantage that a stator may be fitted into a package space that does not permit a circular stator to be accommodated. Some embodiments of the invention allow an electric machine of increased torque capacity to be fabricated compared with a machine of reduced diameter but employing a substantially circular stator. This is made possible by enlarging the diameters of the stator and rotor, and segmenting the stator to fit within the available package space. Advantageously, the larger diameter rotor may house other components such as a clutch arrangement.

Some embodiments of the invention enable an electric machine to be produced that generates less noise than an electric machine having a circular stator of reduced diameter.

Alternatively, the stator may be substantially circular and comprise a plurality of arcuate segments.

The stator may comprise a pair of diametrically opposed stator segments.

This feature has the advantage that forces acting on the rotor may be balanced thereby to reduce vibration and noise associated with motor operation. Furthermore, a reduction in wear of rotor bearings may be enjoyed.

The stator may comprise only two stator segments.

The rotor may be provided with R teeth and the at least one stator segment may be provided with S teeth where R and S are both integer values greater than 1.

It is to be understood that the number of teeth provided on the rotor and the number of teeth provided on the stator must be selected to enable a working machine to be produced Advantageously a machine may be provided where S=2P where P is the number of phases of current supplied to operate the machine.

The electric machine may for example be a 3-phase switched reluctance machine (P=3) where S=6, R=12.

Alternatively the electric machine may be a 4-phase switched reluctance machine (P=4 where S=8, R=18.

In a further alternative the electric machine may be a 5-phase switched reluctance machine (P=5) wherein S=10, R=24.

Advantageously a machine may be provided wherein R=(2P×360/(segment arc))+2 or wherein R=(2P×360/(segment arc))−2.

For the avoidance of doubt it is to be understood that by segment arc is meant the angle subtended at the origin of the radius of curvature of the segment (which will normally correspond to the axis of rotation of the rotor) expressed in degrees. It is to be understood that other numbers of stator segment teeth and rotor teeth are also useful.

Advantageously an electric machine may be provided comprising a plurality of segments and configured wherein in use magnetic flux paths generated in one stator segment are substantially self-contained within that segment and not shared between segments.

Advantageously an electric machine may be provided configured wherein in use magnetic flux paths passing from a segment to the rotor pass substantially through segment teeth and not through circumferentially opposed free ends of the segment.

This feature has the advantage that the free end may be arranged to have one or more coupling features such as one or more through-bores or other feature thereby to facilitate coupling of the segment to a support member without adversely affecting substantially flow of magnetic flux through the segment in use.

The at least one segment may comprise at least one tab portion at least one circumferential free end thereof, the tab portion protruding circumferentially away from a ring portion of the segment from which stator teeth protrude radially inwardly. The tab portions may in some embodiments be considered to be circumferential extensions of the ring portion of the segment. Thus in some embodiments the ring portion may continue beyond one or both end teeth being teeth provided at opposed ends of the segment.

The ring portion may be referred to as a ring segment in some embodiments since it defines a segment of a ring. Teeth of the segment may be integrally formed with the ring portion or attached thereto.

Tab portions may be provided at each end of a segment.

The tab portions may be arranged to allow segments to be placed adjacent to one another to define a substantially continuous multi-segment stator or portion thereof. Segments may for example be placed substantially adjacent to one another to form a substantially continuous circular stator.

The one or more coupling features may for example be provided in, through or on the tab portion, such as one or more through-bores.

The at least one tab portion may be provided with at least one bore therein to accommodate a fixing element e.g. a screw or bolt.

The machine may comprise a hooked fixing element arranged to grip a radially inner surface of a segment and to prevent the segment from moving radially inwardly.

The machine may comprise a hooked fixing element arranged to key into a corresponding formation provided in a circumferential free end of a segment thereby to prevent the segment from moving radially inwardly.

The circular rotor can comprise a plurality of permanent magnets. The machine can be a permanent magnet synchronous motor (PMSM).

The stator can comprise a plurality of said arcuate segments and one or more shield elements. The one or more shield elements can be disposed between adjacent arcuate segments. Each shield element can extend circumferentially between said adjacent arcuate segments. The shield element(s) can reduce the leakage of magnetic flux from said plurality of permanent magnets in the rotor. The shield element(s) can thereby help to reduce or prevent electromagnetic induction in components or assemblies positioned proximal to the rotor caused by a varying magnetic flux as the rotor rotates. The one or more shield elements can have an arcuate profile. The one or more shield elements can be arranged co-axially with the rotor. The arcuate segments in combination with the one or more shield elements can extend circumferentially around the rotor. A uniform air gap can be maintained between the rotor and the one or more shield elements.

The one or more shield elements may be formed integrally with said adjacent arcuate segments. The arcuate segments and said one or more shield elements can be formed from a sheet material, such as electrical steel.

Alternatively, the one or more shield elements can be formed independently of said arcuate segments and mounted between said adjacent arcuate segments. The circumferential ends of the arcuate segments and the shield elements can comprise cooperating keyed profiles. The keyed profiles can cooperate with each other to mount the arcuate segments and the shield elements within the stator. The one or more shield elements can be formed from the same material as the arcuate segments or from a different material. For example, the one or more elements can be formed from a material having magnetic field shielding properties. The one or more shield elements could be formed from electrical steel, copper or mu-metal, for example.

As described herein, the arcuate segments can comprise inter-engaging connectors for coupling like arcuate segments together. The arcuate segments can, for example, each comprise first and second connectors disposed at first and second circumferential ends thereof. The first and second connectors can be adapted to interlock with corresponding first and second connectors provided on like arcuate segments. The first and second connectors can be arranged to inhibit movement of said arcuate segments in a radial and/or a circumferential direction. The first and second connectors can be configured to permit relative movement of the interlocking arcuate segments along respective longitudinal axes (arranged substantially parallel to a longitudinal axis of the stator) to facilitate assembly of the stator. For example, the arcuate segments can be fabricated independently (for example, as a unitary component or from a plurality of said sheet members) and then joined together by said first and second connectors to form the stator.

The one or more shield elements can be provided with connectors for cooperating with the first and second connectors provided on said arcuate segments. The shield elements can interlock with said arcuate segments to form said stator. Thus, the arcuate segments can be coupled to like arcuate segments and/or the shield elements. Equally, several shield elements could be coupled to each other.

In a further aspect of the invention for which protection is sought there is provided a motor vehicle component comprising an electric machine according to any preceding aspect.

The component may comprise a portion of a driveline, optionally a transmission.

In a further aspect of the invention for which protection is sought there is provided a motor vehicle comprising an electric machine or a component according to a preceding aspect.

In one aspect of the invention for which protection is sought there is provided a method of fabricating an electric machine comprising providing a substantially circular rotor and a stator comprising at least one substantially arcuate segment.

The method may comprise causing rotation of the rotor by application of a magnetic field to one or more teeth of the stator.

A portion of the segment facing the rotor may have a radius of curvature corresponding to that of the rotor.

The one or more segments may be formed by a variety of different methods including one or a combination of two or more of the following: pressing of a material provided in powder or granular form; lamination of multiple layers of sheet material; casting; machining and/or any other suitable technique.

In a further aspect of the invention for which protection is sought there is provided an arcuate segment for forming a portion of a stator of an electric machine, the arcuate segment can comprise one or more radially inwardly directed teeth. A plurality of like arcuate segments can be combined to form a stator of an electrical machine. Optionally, one or more shield elements can be incorporated into the stator. The arcuate segment can be configured to be coupled to a like arcuate segment and/or a shield element. For example, the arcuate segment can comprise one or more couplings (for example a male coupling and/or a female coupling) for cooperating with a like arcuate segment and/or a shield element. The one or more couplings can be arranged to prevent radial movement of the arcuate segments relative to each other and/or relative to the shield element. A winding can be on each tooth. The winding can comprise a separate coil for each tooth or a distributed winding.

In a further aspect of the invention for which protection is sought there is provided a stator for an electrical machine comprising at least one of the arcuate segments described herein; and/or at least one of the shield elements described herein.

In a still further aspect of the invention for which protection is sought there is provided a shield element for providing magnetic shielding of an electric machine rotor, the shield element comprising coupling means for coupling the shield element to one or more adjacent arcuate segments. The shield element can provide a shield for magnetic fields generated by one or more permanent magnets in the rotor. The shield element can thereby reduce or prevent electromagnetic induction in components or assemblies positioned in proximity to the rotor. The shield element can be formed from electrical steel, copper, mu-metal or any other material suitable for forming a magnetic shield.

The shield element can have an arcuate profile and, in use, can be arranged coaxially with the rotor. The shield element can comprise a coupling at each circumferential end thereof for coupling the shield element to an adjacent arcuate segment (or a like shield element). The coupling can be a male or female coupling, for example.

The arcuate segments can form the stator of the electric machine. In the assembled electric machine, arcuate segments can be angularly offset from each other and the shield element can be disposed between them. The arcuate segments can be of the type described herein.

According to a further aspect of the present invention there is provided an electric machine comprising a rotor and a stator, wherein the stator is non-circular and comprises:
 a plurality of teeth; and
 a plurality of inter-pole shields;
 wherein each of said inter-pole shields is disposed between the adjacent teeth of said stator. The inter-pole shields can help to balance fields in the electric machine during operation. This balancing function is particularly significant in an electric machine having a non-circular stator since the teeth (and the associated windings) in each phase experience different field distribution depending on their position within the stator. At least in certain embodiments, the provision of inter-pole shields can improve power capability and simplify manufacturing. The non-circular stator can have an interrupted or discontinuous form. Thus, the stator does not have a circular plan form. The stator can be asymmetric.

The inter-pole shield can substantially bisect an aperture formed between said adjacent teeth.

A winding can be disposed on each of said teeth. The inter-pole shields can locate between the windings on adjacent teeth. The windings can be electrically connected to each other in parallel.

The stator can comprise at least one arcuate segment. The inter-pole shields can extend radially inwardly from said at least one arcuate segment. The teeth can also extend radially inwardly from said at least one arcuate segment.

The inter-pole shields can have a radial length which is less than the radial length of said teeth. The inter-pole shields can have a circumferential width which is less than a circumferential width of said teeth.

The at least one arcuate segment can be formed from a plurality of like sheet members disposed on top of each other. The sheet members form laminations of each arcuate segment. The teeth and the inter-pole shields can be defined by said sheet members.

The at least one arcuate segment can comprise a first shield disposed at a first circumferential end and/or a second shield disposed at a second circumferential end.

According to a further aspect of the present invention there is provided an electric machine comprising a plurality of arcuate segments as described herein. The arcuate segments can be spaced apart from each other in said stator; or can be disposed in abutment with each other.

The electric machine can be a permanent magnet synchronous machine.

According to a further aspect of the present invention there is provided a stator segment for forming a portion of a stator of an electric machine, the stator segment comprising:

a plurality of teeth; and
at least one inter-pole shield;
wherein each inter-pole shield is disposed between the adjacent teeth of said stator segment.

The inter-pole shield can substantially bisect an aperture formed between said adjacent teeth.

The stator segment can comprise an arcuate segment. The at least one inter-pole shield can extend radially inwardly from said arcuate segment.

The arcuate segment can comprise a first shield disposed at a first circumferential end; and/or a second shield disposed at a second circumferential end.

According to a further aspect of the present invention there is provided an electric machine comprising one or more stator segments as described herein. The electric machine can be a permanent magnet synchronous machine.

According to a still further aspect of the present invention there is provided a motor vehicle comprising an electric machine as described herein.

According to a yet still further aspect of the present invention there is provided an electric machine comprising a rotor and a stator, the stator comprising a plurality of substantially arcuate segments, each arcuate segment having first and second circumferential ends;
wherein each arcuate segment comprises:
one or more teeth; and
a first shield disposed at said first circumferential end and/or a second shield disposed at said second circumferential end.

In use, the first shield and/or the second shield can operate to close a magnetic flux loop at the respective end(s) of the stator. The shield(s) can operatively capture stray field lines from the stator coil and returns them to the stator pole (tooth). The electric machine can be a permanent magnet electric machine or a switched reluctance electric machine.

A first sector angle can be defined between the first shield and a centre line of the tooth located adjacent to said first shield. In particular, the first sector angle can be defined between a first end wall of the first shield. A second sector angle can be defined between the second shield and a centre line of the tooth located adjacent to said second shield. In particular, the second sector angle can be defined between a second end wall of the second shield. The sum of said first and second sector angles can be substantially equal to a pole pitch of teeth in said stator. The first sector angle can be different from the second sector angle. Alternatively, the first sector angle can be the same as said second sector angle.

The first shield and/or the second shield can extend radially. The first shield and/or the second shield can, for example, extend along an axis/axes extending radially outwardly from a rotational axis of the rotor.

The arcuate segments can each comprise one or more teeth for forming a pole of the electric machine. The one or more teeth can each extend radially. The one or more teeth can, for example, extend along axes extending radially outwardly from the rotational axis of the rotor.

The first shield has a first width in a circumferential direction; and/or said second shield has a second width in a circumferential direction. In arrangements in which the arcuate segment comprises first and second shields, the first and second widths can be substantially equal to each other.

The teeth can each have a third width in a circumferential direction. The third width can be greater than said first width and/or said second width.

The radial extent of said first shield and/or said second shield can be less than the radial extent of said one or more teeth.

The arcuate segments can each be formed as a single, unitary component. Alternatively, the arcuate segments can each be formed from a plurality of like sheet members (laminations) disposed on top of each other. The sheet members can be aligned with each other in a face-to-face configuration. When the sheet members are aligned with each other, the arcuate segment can have a uniform profile along its length.

The sheet members can define said one or more teeth. Furthermore, the sheet members can define said first shield and/or said second shield. The first shield and/or second shield can be formed integrally with said sheet members.

The arcuate segments can be spaced apart from each other in said stator. The arcuate segments can be circumferentially offset from each other. Alternatively, adjacent arcuate segments in the stator can abut against each other. The adjacent arcuate segments can interlock with each other. For example, first and second connectors can be disposed at said first and second circumferential ends of said arcuate segment respectively. The first and second connectors can be adapted to interlock with like arcuate segments. The first and second connectors can be arranged to inhibit movement of said arcuate segments in a radial and/or a circumferential direction. The first and second connectors can be configured to permit relative movement of the interlocking arcuate segments along respective longitudinal axes to facilitate assembly of the stator. For example, the arcuate segments can be fabricated independently (for example, as a unitary component or from a plurality of said sheet members) and then joined together by said first and second connectors to form the stator.

According to a further aspect of the present invention there is provided a motor vehicle component comprising a switched reluctance electric machine or a permanent magnet electric machine as described herein.

According to a still further aspect of the present invention there is provided a stator segment for forming a portion of a stator of an electric machine, the stator segment being substantially arcuate and having one or more teeth;
said stator segment comprising a first shield disposed at a first circumferential end; and a second shield disposed at a second circumferential end;
wherein a first sector angle is defined between the first shield and a centre line of the tooth located adjacent to said first shield; and a second sector angle is defined between the second shield and a centre line of the tooth located adjacent to said second shield; the sum of said first and second sector angles being substantially equal to a pole pitch of the teeth in said stator.

The pole pitch is the angular offset of adjacent teeth in said stator. The first sector angle can be defined between a first end wall of the first shield and a centre line of the adjacent tooth. The second sector angle can be defined between a second end wall of the second shield and a centre line of the adjacent tooth. First and second like stator segments can abut against each other and the first and second shields can be accommodated between the end teeth in each segment whilst maintaining the same pole pitch as between the other teeth in each stator segment. Thus, at least in certain embodiments, the provision of the first and second shields does not alter the pole pitch of the teeth. The first sector angle can be different from the second sector angle. Alternatively, the first sector angle can be the same as said second sector angle.

The stator segment can be formed from a plurality of like sheet members disposed on top of each other. The sheet members can be aligned with each other in a face-to-face configuration. The edges of adjacent sheet members can be aligned with each other such that the arcuate segment has a substantially uniform profile along its length.

The first shield and/or the second shield can extend radially. The first shield and/or the second shield can, for example, extend along an axis/axes extending radially outwardly from a central axis of the assembled stator.

The arcuate segment comprises one or more teeth for forming a pole of the electric machine. The one or more teeth can each extend radially. The one or more teeth can, for example, extend along axes extending radially outwardly from the rotational axis of the rotor.

The first shield has a first width in a circumferential direction; and the second shield has a second width in a circumferential direction. The first and second widths can be substantially equal to each other. The teeth can each have a third width in a circumferential direction. The third width can be greater than said first width and/or said second width.

The radial extent of said first shield and/or said second shield can be less than the radial extent of said one or more teeth.

According to a further aspect of the present invention there is provided an electric machine comprising one of more stator segments of the type described herein. The electric machine can comprise a plurality of said stator segments. The stator segments can be arranged to form a continuous ring-shaped stator; or an interrupted (discontinuous) stator. The electric machine can, for example, be a switched reluctance electric machine; or a permanent magnet synchronous machine.

According to a still further aspect of the present invention, there is provided a motor vehicle comprising an electric machine of the type described herein.

The pole pitch has been defined herein with reference to the centre line of the teeth in the stator. It will be appreciated that other reference planes can be used to measure the pole pitch.

According to a further aspect of the present invention there is provided a stator segment for forming a portion of a stator of an electric machine, the stator segment comprising:
 a ring segment having first and second circumferential ends;
 one or more radially inwardly directed teeth; and
 a protuberance disposed between said first and second circumferential ends of the ring segment, the protuberance extending radially outwardly. The protuberance provides a localised increase in the radial dimensions of the stator segment. The effective diameter of the stator segment is increased locally and this can facilitate the passage of magnetic flux through the stator segment. At least in certain embodiments of the present invention this arrangement can help to ameliorate or avoid saturation of the magnetic flux in the stator segment. The conventional approach to this problem would be to increase the radial dimensions of the stator, but this typically increases packaging requirements and weight.

The stator segment could comprise more than one of said protuberances. For example, the protuberances could be circumferentially spaced apart from each other on said ring segment.

The or each protuberance can be positioned between positive and negative sets of teeth in the stator. The sets of teeth can be arranged adjacent to each other within the stator segment.

The stator segment can have a substantially arcuate profile. The protuberance can be disposed at or proximate to a mid-point of said ring segment. The radial dimensions of the protuberance can be largest at the mid-point of the ring segment.

The protuberance can be convex in plan form. The protuberance can have a curved profile to provide a progressive change in the radial dimensions of the ring segment. The protuberance can have a substantially continuous, uninterrupted section. At least in certain embodiments, the protuberance can be free from apertures and cut-outs. This arrangement can facilitate the distribution of the magnetic flux through the stator segment.

The stator segment can be substantially arcuate in transverse section. The protuberance can extend longitudinally. For example, the protuberance can extend substantially parallel to a longitudinal axis of the stator segment. The longitudinal axis of the stator segment extends substantially parallel to a rotational axis of the rotor in the assembled electric machine.

The protuberance can project radially outwardly from said ring section. The protuberance can be integrally formed with said ring segment. The stator segment can, for example, be formed from a plurality of sheet members (laminations) disposed on top of each other. The sheet members can be arranged in face-to-face contact with each other. The sheet members can each define a transverse section of the stator segment. The protuberance can be defined by some or all of said sheet members. The sheet members can each define the ring segment and the protuberance.

The sheet members can all be the same as each other to form a stator segment having a uniform longitudinal profile. Alternatively, the sheet members making up the stator segment can have different profiles, for example to alter the shape of the protuberance in a longitudinal direction.

The protuberance could be formed separately and mounted to said ring segment. In this arrangement, the air gap between the protuberance and the ring segment should be minimised to promote the passage of the magnetic flux into the protuberance. The protuberance could, for example, abut against said ring segment when mounted in position.

According to a further aspect of the present invention, there is provided an electric machine comprising one or more stator segments as described herein. The electric machine can be a switched reluctance electric machine.

According to a yet further aspect of the present invention there is provided a stator for an electric machine, the stator comprising:
 a ring section;
 one or more radially inwardly directed teeth disposed on said ring section; and
 at least one radially outwardly extending protuberance disposed on said ring section. The at least one protuberance can help to reduce or avoid saturation of the magnetic flux. Moreover, the at least one protuberance can increase the surface area of the stator (when compared to a conventional circular stator). At least in certain embodiments, the increased surface area can facilitate dissipation of thermal energy from the stator.

The stator can comprise a plurality of said protuberances. The protuberances can be disposed around the circumference of the ring section. Moreover, the protuberances can be evenly spaced around the circumference of said ring section.

The at least one protuberance can be formed integrally with said ring section. The stator can, for example, be formed from a plurality of sheet members (laminations) each defining a layer of the stator. The sheet members can each define said ring section and said at least one protuberance. The sheet members can each optionally also define said one or more radially inwardly directed teeth. At least in certain embodiments, the ring section, one or more teeth and said at least one protuberance can all be formed from said sheet members. In the assembled stator, the sheet members are stacked on top of each other.

According to a still further aspect of the present invention there is provided an electric machine comprising a stator as described herein.

According to a still further aspect of the present invention, there is provided a vehicle comprising an electric machine of the type described herein.

In a further aspect of the invention for which protection is sought there is provided an arcuate segment for forming a portion of a stator of an electric machine, the arcuate segment can comprise one or more radially inwardly directed teeth. A plurality of like arcuate segments can be combined to form a stator of an electrical machine. Optionally, one or more shield elements can be incorporated into the stator. The arcuate segment can be configured to be coupled to a like arcuate segment and/or a shield element. For example, the arcuate segment can comprise one or more couplings (for example a male coupling and/or a female coupling) for cooperating with a like arcuate segment and/or a shield element. The one or more couplings can be arranged to prevent radial movement of the arcuate segments relative to each other and/or relative to the shield element. A winding can be on each tooth. The winding can comprise a separate coil for each tooth or a distributed winding.

In a further aspect of the invention for which protection is sought there is provided a stator for an electrical machine comprising at least one of the arcuate segments described herein.

Within the scope of this application it is expressly intended that the various aspects, embodiments, examples and alternatives, and in particular the individual features thereof, set out in the preceding paragraphs, in the claims and/or in the following description and drawings may be taken independently or in any combination. Features described with reference to one embodiment are applicable to all embodiments, unless there is incompatibility of features.

For the avoidance of doubt, it is to be understood that features described with respect to one aspect of the invention may be included within any other aspect of the invention, alone or in appropriate combination with one or more other features.

BRIEF DESCRIPTION OF THE DRAWINGS

Embodiments of the invention will now be described, by way of example only, with reference to the accompanying figures in which:

FIG. 5 is a schematic illustration of a segment of the stator of FIG. 4;

FIG. 6 is a schematic illustration of a modified arrangement of the segmented stator of FIGS. 3, 4 and 5 according to an embodiment of the present invention;

FIG. 7 is a schematic illustration of a further modified arrangement of the segmented stator of FIGS. 3, 4 and 5 according to an embodiment of the present invention;

FIG. 8 is a schematic illustration of a further modified arrangement of the segmented stator of FIGS. 3, 4 and 5 according to an embodiment of the present invention;

FIGS. 9(a) and (b) are schematic illustrations of doubly salient permanent magnet (DSPM) electric machines according to embodiments of the present invention having respective different fastener element arrangements;

FIG. 10 is a schematic illustration of a switched reluctance electric machine according to an embodiment of the invention having a substantially circular stator formed from a plurality of stator segments;

FIG. 11 is a schematic illustration of a permanent magnet synchronous motor (PMSM) according to embodiments of the present invention;

FIGS. 12A and 12B are schematic illustrations of a modified arrangement of the PMSM shown in FIG. 11 incorporating integrated shield elements;

FIG. 13 is a schematic illustration of a modified arrangement of the PMSM shown in FIGS. 12A and 12B incorporating separate shield elements mounted to the arcuate segments.

DETAILED DESCRIPTION

Figure 1:
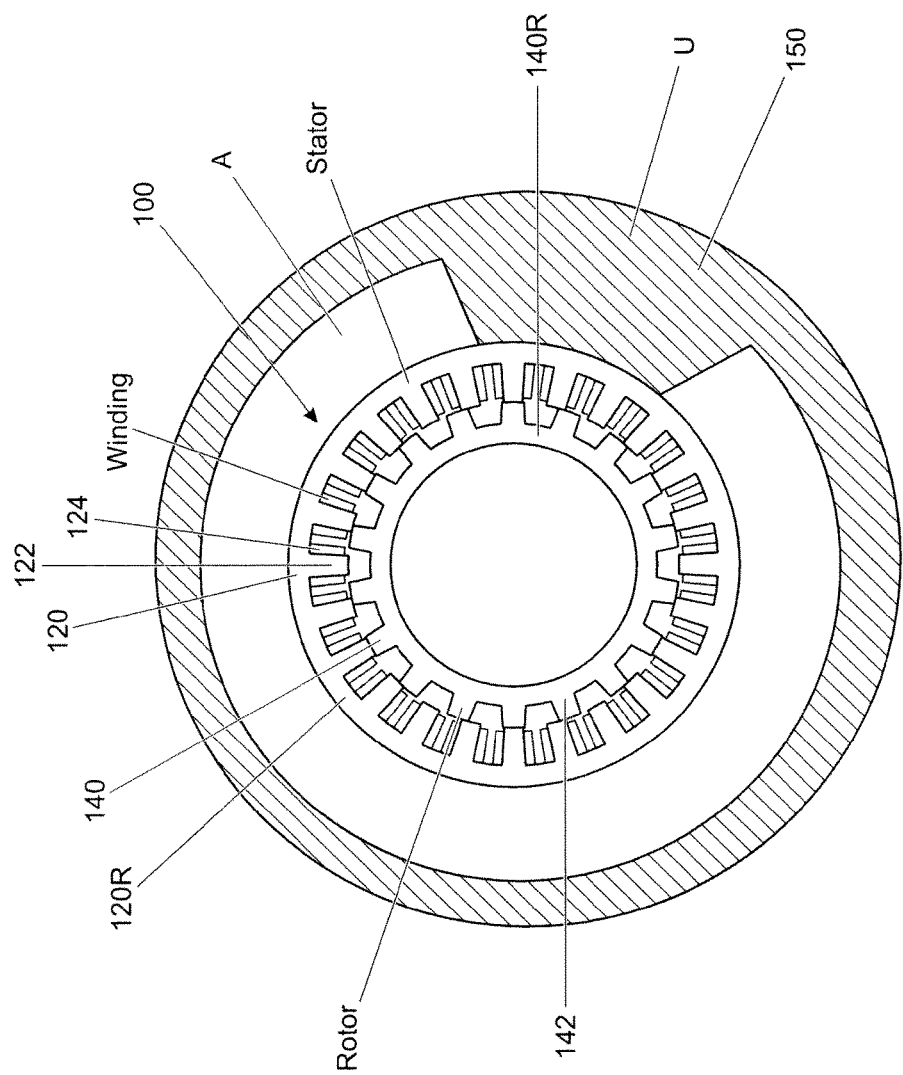
FIG. 1 is a schematic illustration of a switched reluctance motor (SRM) installed inside a motor vehicle component.

FIG. 1 is a schematic illustration showing a switched reluctance motor (SRM) 100 installed in a package 150. In the SRM 100 shown, the package 150 is provided by a portion of a motor vehicle component 150. The component 150 has an available package space A that is not occupied by the SRM 100. The area shaded U corresponds to an internal volume of the component 150 that is unavailable to house the stator or rotor of the SRM 100.

The SRM 100 shown has a substantially circular stator 120 that is rigidly fixed to the component 150. The stator 120 is formed from a ferromagnetic material and has 24 teeth 122 that project radially inwardly from a ring portion 120R of the stator 120. Each tooth 122 has a coil 124 wrapped therearound which may be energised selectively in order to generate magnetic flux in the tooth 122. Coils of different teeth may be connected to form phases.

The SRM 100 has a substantially circular rotor 140 located coaxially of the stator 120. The rotor 140 is free to rotate within the stator 120. The rotor 140 has 18 teeth 142 that project radially outwardly from a ring portion 140R of the rotor 140.

The present inventors have recognised that improved use may be made of the available package space within the component 150 by employing a stator of larger diameter but which is discontinuous. That is, the stator does not define a circle and is therefore non-circular (or may be considered to define only a portion of a circle).

FIG. 2(a) shows schematically the SRM 100 of FIG. 1 with the stator of FIG. 1 divided into three substantially arcuate segments S1, S2, S3 of substantially equal size. The segments S1, S2, S3 each have 8 teeth.

Figure 2:
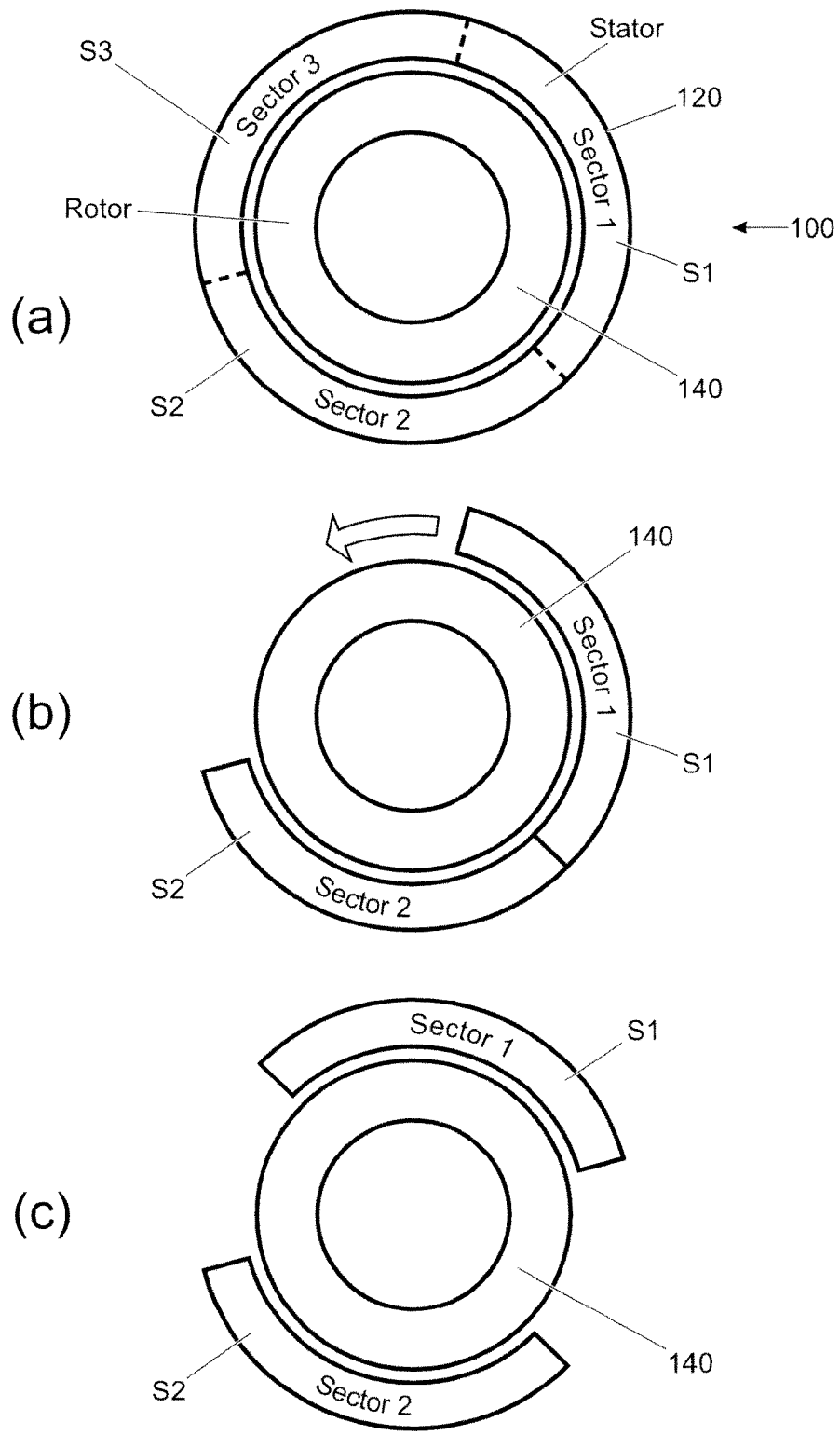
FIG. 2 is a schematic illustration showing conceptually how the SRM of FIG. 1 may be converted to a segment motor according to an embodiment of the present invention.

FIG. 2(b) shows the SRM 100 of FIG. 1 after removal of one of the three segments S3 to form a motor having only two segments S1, S2. FIG. 2(c) shows the SRM of FIG. 2 with the segments S1, S2 positioned diametrically opposite one another about the rotor 140.

Figure 3:
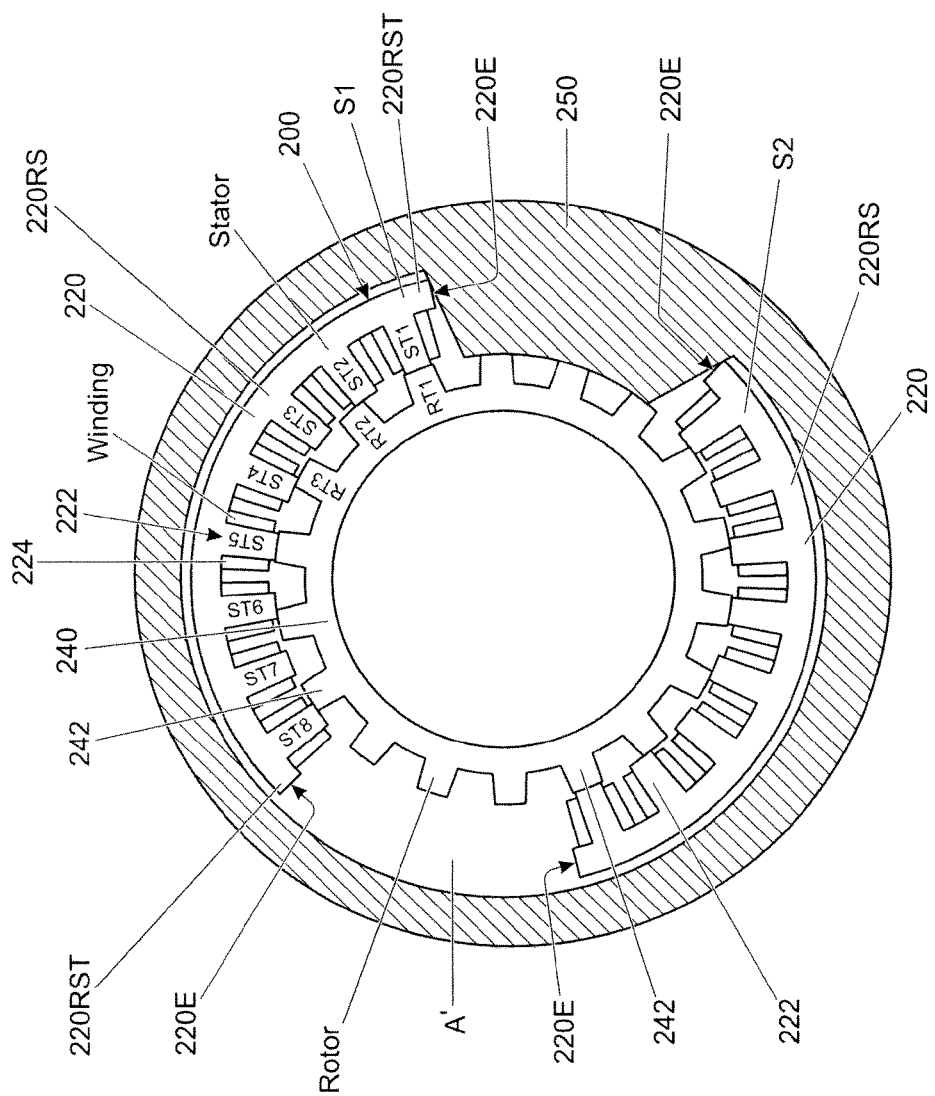
FIG. 3 is a schematic illustration of a SRM according to an embodiment of the present invention having a segmented stator installed in the motor vehicle component shown in FIG. 1.

FIG. 3 shows an SRM 200 according to an embodiment of the invention installed in the motor vehicle component 150 shown in FIG. 1. Like features of the embodiment of FIG. 3 to that of FIG. 1 are provided with like reference signs incremented by 100. The resulting SRM 200 has a greater maximum torque capability than the SRM 100 of FIG. 1. It also enjoys more quiet operation. Additionally, the larger rotor diameter may house a clutch or other component.

The SRM 200 employs a rotor 240 having a diameter that is substantially the same as to that of the stator 120 of the SRM 100 of FIG. 1. As described above, the SRM 200 has a non-circular stator 220 in the form of a pair of segments S1, S2 provided at diametrically opposed locations about the rotor 240. The pair of segments S1, S2 each have 8 teeth 222. The angular spacing of the teeth 222 is equivalent to that of a circular stator of equivalent diameter having 24 teeth. The rotor 240 has 18 teeth 242 as per the SRM 100 of FIG. 1.

Around each tooth 222 of the stator 220 is provided a coil 224 operable to induce magnetic flux in the corresponding tooth 222 when current is passed therethrough.

As noted above, each stator segment S1, S2 has 8 teeth projecting radially inwardly therefrom. In general, the stator segment tooth number, rotor tooth number and stator segment arc are selected such that the resulting flux paths within a given segment are substantially self-contained. The stator segment tooth number, rotor tooth number and stator segment arc may also be selected to enable relatively high, substantially continuous torque to be produced. That is, flux paths may be established through each segment S1, S2 and the rotor 240 so as to form complete flux circuits without a requirement for flux to close via the other stator segment S2, S1.

Each segment S1, S2 may be considered to have two halves each having 4 teeth. In the case of segment S1, a first half of segment S1 has teeth ST1-ST4 whilst a second half has teeth ST5-ST8. The coils 224 are operable to generate magnetic flux in their respective tooth when energised such that flux flows through teeth ST1, ST3, ST6 and ST8 in a radially inward direction and through teeth ST2, ST4, ST5 and ST7 in a radially outward direction. In an alternative embodiment the coils 224 are arranged to generate magnetic flux in their respective tooth when energised such that flux flows through teeth ST1, ST2, ST3 and ST4 in a radially inward direction and through teeth ST5, ST6, ST7 and ST8 in a radially outward direction. In a further alternative embodiment the coils 224 are arranged to generate flux in their respective tooth when energised such that flux flows through teeth ST1, ST3, ST5 and ST7 in a radially outward direction and ST2, ST4, ST6 and ST8 in a radially inward direction. Other arrangements are also useful. The coil arrangement sequence may differ in different combinations of phases, stator teeth and rotor teeth.

A sequence in which coils 224 of each tooth 222 of the embodiment of FIG. 3 are energised will now be described.

In the particular position illustrated in FIG. 3, the rotor 240 is shown in a position where tooth ST1 of the stator 220 is aligned with a tooth RT1 of the rotor 240. If the coil 224 associated with tooth ST1 is energised, the rotor 240 will resist rotation since in the rotational position shown the resistance to flow of magnetic flux through RT1 is at a minimum. In contrast, tooth ST2 adjacent tooth ST1 is in only partial alignment with tooth RT2 of the rotor 240 such that if the rotor 240 rotates in a clockwise direction tooth RT2 of the rotor 240 will come into alignment with tooth ST2 of the stator 220, reducing the resistance to flow of magnetic flux through tooth ST2. If the coil 224 associated with tooth ST2 is energised, a torque will act on the rotor 240 in a direction to rotate the rotor 240 in a clockwise direction to bring rotor tooth RT2 into alignment with stator tooth ST2.

Figure 4:
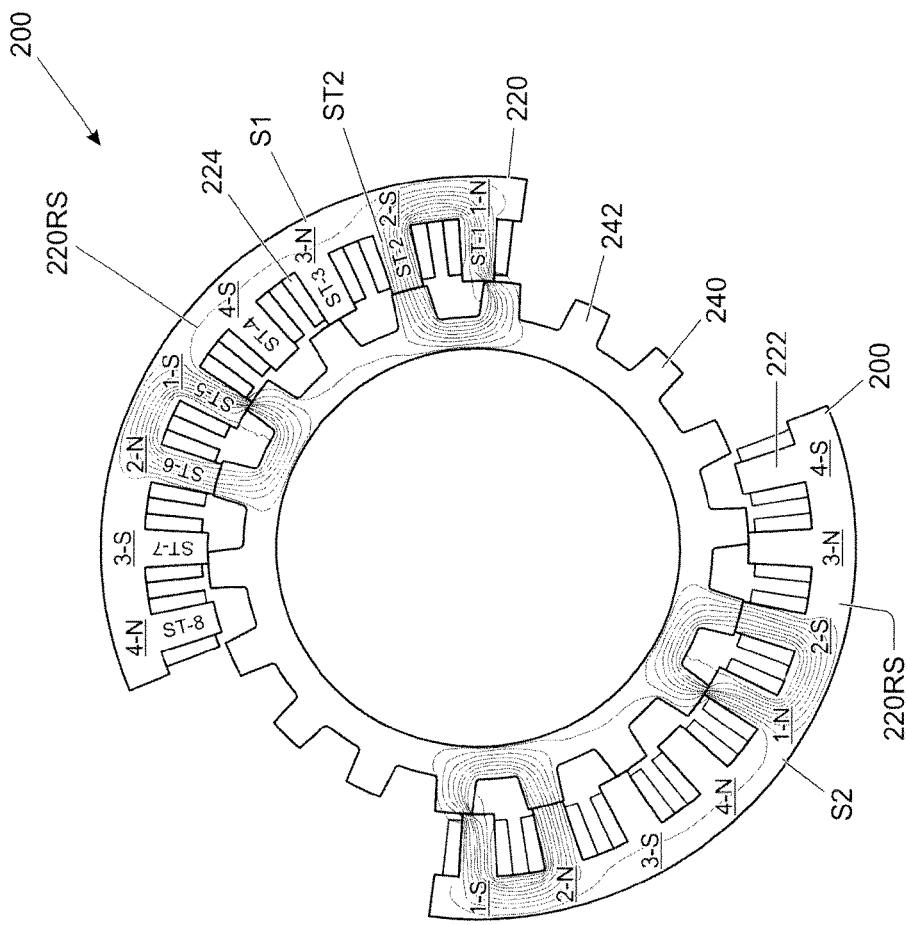
FIG. 4 is a schematic illustration of the stator and rotor of the SRM of FIG. 3 showing flux lines present in the structure at a particular angular position of the rotor with respect to the stator.

FIG. 4 is a schematic illustration of the stator 220 and rotor 240 of the embodiment of FIG. 3, showing flux lines established in the magnetic circuit defined by the stator 220 and rotor 240 at a particular angular position of the rotor 240. Indicated on the figure is the polarity of the magnetic field established in each stator tooth ST1-ST8 in a particular configuration of operation. Letter N indicates that the coil 224 of a given tooth is arranged to generate a magnetic field with a north pole at a radially outward end of the coil (towards ring segment or ring portion 220RS which may also be referred to as a 'backiron' of the stator 220) with a south pole at a radially inward end of the coil 224. Letter S indicates that a south pole is present at the radially outward end of the coil, with a north pole at a radially inward end. The polar configurations in the particular arrangement illustrated in FIG. 4 are:

ST-1: North pole generated at the radially outward end of the coil 224
ST-2: South pole generated at the radially outward end of the coil 224
ST-3: North pole generated at the radially outward end of the coil 224
ST-4: South pole generated at the radially outward end of the coil 224
ST-5: South pole generated at the radially outward end of the coil 224
ST-6: North pole generated at the radially outward end of the coil 224
ST-7: South pole generated at the radially outward end of the coil 224
ST-8: North pole generated at the radially outward end of the coil 224

In this mode of operation, the coils 224 of the stator 220 are energised in the following sequence in order to induce rotation of the rotor 240 in a clockwise direction:

1. Coils of teeth ST1, ST2
2. Coils of teeth ST2, ST3
3. Coils of teeth ST3, ST4
4. Coils of teeth ST4, ST1

The cycle of energising coils 224 then repeats at step 1. It is to be understood that in the embodiment shown the coils 224 of teeth ST5 to ST8 are energised in a corresponding manner to those of teeth ST1 to ST4. Other arrangements are also useful.

The coils 224 of the second stator segment S2 are energised in a corresponding manner to the coils 224 of segment S1. Other modes of operation are also useful.

The machine may be provided where each stator segment has $S=2P$ teeth and the rotor has $R=(2P\times360/(\text{Segment Arc}))+2$ teeth or $R=(2P\times360/(\text{segment arc}))-2$ teeth.

It is to be understood that, as discussed above, some embodiments of the present invention are designed such that magnetic flux paths are not established between stator segments S1, S2. Thus it is not required for magnetic flux lines to flow through a circumferential end 220E of a given stator segment S1, S2. This feature has the advantage that fixings may be passed through portions of the segments S1, S2 at circumferential end portions thereof without disturbing substantially a flow of magnetic flux through the segments S1, S2.

FIG. 5 is an enlarged view of stator segment S1. The stator segment S1 may be considered to comprise a ring segment 220RS from which teeth 222 of the stator 220 project radially inwardly towards the rotor 240. At circumferentially opposed ends of the ring segment 220RS, ring segment tabs 220RST are provided. The tabs 220RST are portions of the ring segment 220RS that project circumferentially beyond stator teeth ST1, ST8 at circumferentially opposed ends of the segment S1. Since magnetic flux flowing through the stator segment S1 is arranged not to flow from one segment S1 to the other S2, flux is not required to flow through the tabs 220RST. Accordingly, the tabs 220RST are each provided with a through-bore 220RSB in order to accommodate fixing elements for fixing the segments S1, S2 to a support structure such as component 150. More than one through-bore 220 RSB may be provided in some embodiments. In some embodiments, instead of a through-bore one or more other features may be formed to facilitate fixing of the segments S1, S2 to a support structure such as one or more recesses, grooves or the like as discussed in further detail below. In some embodiments one or more features may be provided to secure the segments to one another either in abutment or in spaced apart relationship. The segments may in some embodiments have complimentary inter-engaging formations by means of which the segments may be coupled to one another. In some embodiments the segments may interlock with one another and/or with a portion of a structure in which the segments are provided. A range of different types of formation may be provided, such as a dove-tail type arrangements, tongue and groove or any other suitable types of formation.

It is to be understood that this feature represents a substantial advantage over the prior art SRM 100 of FIG. 1. Stators in electric machines are subject to not inconsiderable forces seeking to reduce an air gap between the stator and rotor. It is therefore important to secure the stator to a housing or other support to prevent relative movement between the rotor and stator without causing substantial disturbance to or disruption of the flow of magnetic flux through the stator. Disturbance or disruption of the flow can readily occur when apertures, recesses or the like are formed in a rotor. Accordingly, some embodiments of the present invention allow improved attachment of the stator resulting in enhanced component service life. In some embodiments improved attachment allows reduced noise and vibrations during motor operation, for example by suppressing acoustic vibrations.

It is to be understood that embodiments of the present invention have the advantage that an amount of torque that may be developed by the subject electric machine is in some embodiments greater than that which would be produced by a known machine having a circular stator of a diameter substantially equal to that of the rotor of the subject machine. Embodiments of the invention enable more powerful electric machines to be developed that fit within available non-circular package space.

It is to be understood that embodiments of the present invention having a segmented stator may have any suitable number of segments, provided that the resulting flux paths are substantially self-contained within each segment. Embodiments of the invention allow a more flexible modular design since a designer may design a motor with any required number of segments, the segments being provided at any appropriate circumferential location. An electric machine according to an embodiment of the invention is advantageously operated with one or more pairs of stators at diametrically opposed locations about the rotor so that forces acting to close an air gap between rotor and stator act in opposite directions thereby substantially to cancel one another. However not all embodiments have this arrangement. In some embodiments an electric machine may be provided having substantially only one stator segment.

A modified version of the stator segment S1 for the SRM 200 shown in FIGS. 3, 4 and 5 is illustrated in FIG. 6. Like reference numerals are used to represent like components.

The SRM 200 employs a rotor 240 and a stator 220 formed by a pair of segments S1, S2 provided at diametrically opposed locations about the rotor 240. The pair of segments S1, S2 each have eight (8) teeth ST1-ST8. The angular spacing of the teeth ST1-ST8 is equivalent to that of a circular stator of equivalent diameter having twenty-four (24) teeth. The teeth ST1-ST8 each have a centre line $C_{1-8}$ and a pole pitch $\theta$ is defined between the centre line $C_{1-8}$ of adjacent teeth ST1-ST8. The pole pitch $\theta$ is the same for all of the teeth ST1-ST8 in each segment S1, S2 and, in the present embodiment, is 15°. The rotor 240 has eighteen (18) teeth 242.

The segments S1, S2 each comprise first and second shields 244, 246 disposed at each circumferential end thereof. This modified arrangement will be described with reference to a single segment S1 for the sake of clarity, but it will be appreciated that the other segment(s) S2, S3 making up the stator 220 would have the same configuration.

The first and second shields 244, 246 extend radially inwardly from the ring segment 220RS. The radial length of each shield 244, 246 is less than that of the teeth ST1-ST8 of the stator 220. Furthermore, the width of each of said first and second shields 244, 246 is less than that of the teeth ST1-ST8 of the stator 220. The first and second shields 244, 246 define respective first and second circumferential end walls 248, 250 of the segment S1.

A first outer face 252 of the first end wall 248 defines a first radial plane P1. The first radial plane P1 and the centre line $C_1$ of the adjacent tooth ST1 define a sector angle $\alpha$ which is half the pole pitch $\theta$. In other words, the angular offset between the first radial plane P1 and the adjacent tooth ST1 is half the angular offset between two adjacent teeth ST1-ST8. In the present embodiment, the sector angle $\alpha$ is 7.5°. A second outer face 254 of the second end wall 250 defines a second radial plane P2 having the same configuration at the other end of the segment S1.

When the segment S1 is juxtaposed to a like segment S2, the first and second end walls 248, 250 of the first and second shields 244, 246 abut each other in face-to-face engagement. The first and second shields 244, 246 are accommodated between adjacent teeth ST1, ST8 of the respective segments S1, S2. The configuration of the first and second shields 244, 246 is such that the pole pitch $\theta$ of the adjacent teeth ST1, ST8 is unchanged from that between the teeth ST1-ST8 in each segment S1, S2. The first and second shields 244, 246 in the present embodiment are arranged to define the same sector angle $\alpha$. In a further modified arrangement, the first and second shields 244, 246 could define first and second sector angle $\alpha_1$, $\alpha_2$ which are different from each other but when summed are substantially equal to the pole pitch $\theta$ of the teeth ST1-ST8 (i.e. $\alpha_1 + \alpha_2 = \theta$). This offset arrangement would, however, reduce the available space for the windings 224.

It is not essential that the first and second end walls 248, 250 are planar. In an alternate arrangement, the first and second end walls 248, 250 could have cooperating non-planar surfaces, for example to inhibit relative radial movement of segments S1, S2. This arrangement could be used in addition to, or instead of the cooperating features described herein to key adjacent segments S1, S2 together. A further alternative would be to have first and second end walls 248, 250 which have corresponding angular offsets from the radial plane P1.

When the SRM 200 is operating, the first shield 244 and the second shield 246 close a magnetic flux loop at the respective end(s) of the segments S1, S2. The stray field lines are captured from the stator coils and are returned to the stator pole (tooth).

A further development of the modified version of the stator segment S1 shown in FIG. 6 will now be described with reference to FIG. 7. In this arrangement, an inter-pole shield element 256 is disposed between adjacent poles of the stator 220. The inter-pole shield elements 256 are each disposed along a radial axis which bisects the pole pitch θ of adjacent teeth ST1-ST8. Thus, the inter-pole shield elements 256 bisect the angle defined between the adjacent pairs of teeth ST1-ST8. Thus, the inter-pole shield elements 256 are disposed midway between adjacent teeth ST1-ST8 within the stator segment S1. It will be appreciated that the angle between adjacent inter-pole shield elements 256 is, therefore, the same as the pole pitch θ.

The inter-pole shield elements 256 are elongated members which each extend radially inwardly from the ring segment 220RS. The radial length of each inter-pole shield element 256 is less than that of the teeth 222. Likewise, the circumferential width of each inter-pole shield element 256 is less than that of the teeth 222. In the present embodiment, the segment S1 is formed from a plurality of like sheet members (or laminations) arranged in face-to-face contact with each other to form a transverse section of the segment S1. The inter-pole shield elements 256 are formed in said sheet members and, therefore, are integral with the ring segment 220RS and the teeth ST1-ST8.

The inter-pole shielding elements 256 are particularly advantageous in arrangements whereby the stator 220 is non-circular (for example discontinuous or asymmetric), as illustrated in FIGS. 3 and 4. In these non-circular arrangements, the inventor(s) have determined that, at least in certain embodiments, an unbalanced load can result at each pole due to the different relative positions of the windings 224 within each segment S1, S2. (This problem is significant in an electric machine 200 having a circular/continuous stator 220 since the teeth ST1-ST8 all have the same position in relation to each other.) The provision of the inter-pole shield elements 256 can help to separate each pole within the electric machine 200, thereby helping to balance the load on the windings 224 in each phase. At least in certain embodiments, balancing the load can help to improve efficiency. Moreover, the manufacture of the electric machine 200 can be simplified as the windings 224 can be electrically connected in parallel to each other (which is simpler to manufacture than a series arrangement).

The provision of inter-pole shield elements 256 has particular application in permanent magnet synchronous electric machines 200. However, the inter-pole shield elements 256 could be utilised in other types of electric machine 200.

The segment S1 illustrated in FIG. 7 comprises first and second shields 244, 246 disposed at each circumferential end thereof. It will be appreciated that one or both of the shields 244, 246 could be omitted. For example, the segment S1 could comprise only a first shield 244 disposed at a first circumferential end thereof. When a plurality of like segments S1 are juxtaposed, the single first shield 244 would form an inter-pole shield element 256 between the end teeth ST1, ST8 disposed on adjacent segments S1, S2.

A further modified version of the stator segment S1 for the SRM 200 shown in FIGS. 3, 4 and 5 is illustrated in FIG. 8. Like reference numerals are again used to represent like components.

The SRM 200 employs a rotor 240 and a stator 220 formed by a pair of segments S1, S2 provided at diametrically opposed locations about the rotor 240. The pair of segments S1, S2 each have six (6) teeth ST1-ST6 extending radially inwardly from a ring segment 220RS. The angular spacing of the teeth ST1-ST6 is equivalent to that of a circular stator of equivalent diameter having eighteen (18) teeth. The rotor 240 has twelve (12) teeth 242. The magnetic flux within the segment S1 is illustrated by flux lines F in FIG. 8.

In this modified arrangement, the segments S1, S2 each comprise a protuberance 258 for controlling the magnetic flux established therein when the SRM 200 is operating. The protuberance 258 in each segment S1, S2 is provided in the region of the ring segment 220RS located circumferentially between the positive and negative teeth ST1-ST6. For example, in the present embodiment the protuberance 258 in each segment S1, S2 is located in the region between the positive teeth (ST1, ST2, ST3) and the negative teeth (ST4, ST5, ST6). The protuberances 258 provide a localised increase in the radial dimensions of each segment S1, S2 to facilitate the passage of magnetic flux through the respective segments S1, S2. The protuberance 258 can thereby delay or prevent saturation of the magnetic flux in the segments S1, S2. The protuberance 258 is illustrated in FIG. 8 only on the segment S1 and the description of this feature will be directed to this segment S1. However, it will be appreciated that a corresponding protuberance 258 would be formed on the other segment S2.

In the present embodiment, the protuberance 258 has a generally convex plan form and extends radially outwardly from the ring segment 220RS. The protuberance 258 has a curved profile which defines a progressive change in the radial dimensions of the ring segment 220RS. The maximum radial extent of the protuberance 258 is substantially coincident with a circumferential mid-point of the ring segment 220RS to counter the localised build-up of magnetic flux in this region.

The protuberance 258 extends in longitudinally, substantially parallel to the rotational axis of the rotor 240, along the segments S1, S2. In the present embodiment, the segments S1, S2 are each formed from a plurality of like sheet members (or laminations) arranged in face-to-face contact with each other. The sheet members each define a transverse section of the segments S1, S2 and can, for example, be made of electrical steel, copper or mu-metal (i.e. nickel-iron alloys). The protuberance 258 is thereby formed integrally with the ring segment 220RS and the teeth ST1-ST8. Other techniques can be used to fabricate the stator segment S1, S2.

The ring segment 220RS could be provided with more than one protuberance 258. The inventor(s) in the present case have recognised also that, at least in certain arrangements, it can be advantageous to provide one or more protuberances 258 on a continuous (i.e. circular) stator. The protuberances 258 could, for example, be disposed around the circumference of the stator 220.

FIG. 9A shows an electric machine 300 according to an embodiment of the present invention based on a doubly-salient permanent magnet (DSPM) electric machine design. Like features of the embodiment of FIG. 9A to those of the embodiment of FIG. 3 are provided with like reference signs incremented by 100. The machine 300 has a segmented stator 320 having first and second segments S1, S2. Each of the segments S1, S2 has a ring segment 320RS (or backiron) from which stator teeth 322 protrude radially inwardly. Each tooth 322 has a winding therearound as in the embodiment of FIG. 3 and FIG. 5. In contrast to the segments S1, S2 of the embodiment of FIG. 3 and FIG. 5 the segments S1, S2 of the embodiment of FIG. 9A have permanent magnet elements PM1, PM2 inserted in the ring segment 320RS of the segments S1, S2 between the first and second stator teeth ST-1, ST-2 and the fourth and fifth stator teeth ST-4, ST-5 respectively. The magnets PM are oriented in the circumferential (azimuthal) direction but opposing each other. In the embodiment shown magnet PM1 is oriented to generate a magnetic field in an anticlockwise circumferential direction (arrow M1 of FIG. 9A pointing in a direction from south pole to north pole) whilst magnet PM2 is oriented to generate a magnetic field in a clockwise direction. (arrow M2 of FIG. 9A pointing in a direction from south pole to north pole). As a result, flux generated by the magnets PM1, PM2 is encouraged to flow through one or more of enclosed stator teeth ST-2, ST-3 and/or ST-4, being teeth enclosed circumferentially by the magnets PM1, PM2.

For the DSPM machine 300 of FIG. 9A the rotor 340 has 12 teeth 342 and each stator segment S1, S2 has 6 teeth 322. The angular spacing between the stator teeth 322 is equivalent to that of a circular stator having 18 teeth. The DSPM machine 300 is arranged for 3 phase operation. Other arrangements of stator/rotor teeth combinations are also useful.

It is to be understood that the permanent magnet elements PM1, PM2 may be inserted at any suitable location. In general, the magnet elements PM1, PM2 are typically arranged to be spaced apart by a number of teeth that is equal to half the total number of teeth of that segment. Furthermore, the number of teeth enclosed by the magnets PM1, PM2 is typically equal to the number of phases. The number of teeth in a given segment is therefore typically equal to twice the number of phases, as noted above. Other arrangements are also useful.

In the embodiment of FIG. 9A, the component 150 in which the stator segments S1, S2 are provided has fastener elements 320F that grip a free end of a ring segment tab 32ORST of each segment S1, S2. It can be seen that the component has an internal wall 150W having a portion having a radius of curvature corresponding to an outer radius of curvature of each segment S1, S2. Thus the segments S1, S2 may be arranged to rest snugly against this portion of the internal wall 150W. The fastening elements 320F protrude substantially radially inwardly from this portion of the internal wall 150W and have a hooked end 320FH projecting in a substantially circumferential direction that keys into a corresponding recess 320RSR in the circumferential free end of the ring segment tab 320RST. By circumferential free end of the ring segment tab 320RST is meant a free end of the ring segment 320RS with respect to a circumferential direction.

At an opposite end of the ring segment 320RS to the element 320F the respective segments S1, S2 abut a portion of the internal wall 150W of the component 150 that projects radially inwardly with respect to the portion of the wall 150W against which a radially outer surface of each segment S1, S2 is in abutment. A corresponding fastener element 320F' may be provided at this free end of the segment S1, S2 that keys into a corresponding recess 320RSR' in the ring segment tab 320RST. It is to be understood that the provision of fastener elements 320F, 320F' at one or both ends of the segments S1, S2 promotes rigid positioning of the segment S1, S2 with respect to the housing 150 and rotor 340, reducing noise and/or vibrations associated with operation of the electric machine 300.

FIG. 9B shows an electric machine 400 similar to that of the embodiment of FIG. 9A. Like features of the embodiment of FIG. 9B to those of the embodiment of FIG. 9A are shown with like reference signs incremented by 100.

In the embodiment of FIG. 9B the fastener element 420F at one end of each segment S1, S2 is arranged to protrude radially inwardly from the inner wall 150W in a similar manner to the element 320F of the embodiment of FIG. 9A. However, instead of keying into recesses 320RSR, 320RSR' in the free ends of the segments S1, S2 the fastener elements 420F protrude circumferentially to grip a radially inner surface of the respective ring segments 320RS. At an opposite end of each of the segments S1, S2, fastener elements 420F' protrude circumferentially from the inwardly protruding portion of wall 150W. The elements 420F' abut the radially inner surface of the respective ring segment 320RS to prevent the segments S1, S2 from moving radially inwardly and out from abutment with the inner wall 150W.

Some non-limiting examples of stator/rotor teeth combinations will now be described where the number of stator teeth and rotor teeth given is that for an equivalent circular stator. For SRM machines a 24/16 tooth combination and multiples thereof may be employed for 3 phase operation (90 degree segments). An 18/12 tooth combination may also be employed for 3 phase operation (120 degree segments). A 24/18 tooth combination and multiples thereof may be employed for 4 phase operation (120 degree segments). A 30/24 tooth combination and multiples thereof may be employed for 5 phase operation (120 degree segments). Other ratios are also useful.

It is to be understood that in some embodiments flux patterns established during operation of the electric machine in use are arranged to have similar torque ripple to an electric machine of similar rotor/stator diameter having a substantially circular stator. The flux patterns may be designed to include short and long path flux loops or a combination thereof.

For a Permanent Magnet Synchronous Machine (PMSM), for 3 phase operation an 18/12, 36/24 or 18/24 tooth combination and multiples thereof may be employed. Other ratios are also useful.

For the DSPM machine, for 3 phase operation a 24/16 or 18/12 tooth combination and multiples thereof may be employed. Other ratios are also useful.

It is to be understood that embodiments are applicable to the modification of a number of different types of electric machine and a number of different topologies including radial, axial and transverse flux topologies and technologies including SRM, DSPM, PMSM, induction and wound field electric machines.

It is to be understood that for a given electric machine, the number of teeth on a given segment is preferably selected so that during operation magnetic flux lines developed in the segment and rotor as it rotates are substantially self-contained, i.e. the flux lines developed in one segment flow through that one segment only and not through an adjacent segment. Furthermore, the flux lines may be arranged not to flow out of a segment in a circumferential direction through a circumferential end thereof, but flow between the segment and rotor through teeth of the rotor and segment.

Embodiments of the present invention have the advantage that more constrained stator laminations may be constructed. The laminations may be constructed to have different natural frequencies of vibration, thereby reducing radiated noise as well as reducing transmitted vibrations.

As discussed above, embodiments of the invention allow an electric machine to be fabricated having a larger rotor diameter and therefore the potential to provide more space within the rotor for the provision of a clutch or other mechanical device such as a power split device. Other components can be integrated into the electric machine in addition or instead such as one or more electronic components.

Some embodiments of the present invention allow electric machines of increased rotor and therefore stator diameter to be provided in situations where a volume in which the machine is to be packaged does not permit a circular stator describing an angle of substantially 360 degrees to be provided.

Some embodiments of the invention overcome the problem by providing a non-circular stator in the form of one or more segments of an otherwise circular stator. The rotor may remain substantially circular. The stator may curve to subtend any suitable angle such as 60°, 90°, 120°, 180°, 240° or any other suitable angle.

The number of stator/rotor teeth may be arranged to enable operation of the motor such that each segment is magnetically independent of the other, i.e. the flux associated with one segment is substantially unaffected by the flux associated with another one or more segments in the case the electric machine has a plurality of stator segments. It is to be understood that where a plurality of stator segments are provided, the application of magnetic fields to respective teeth of respective segments may be coordinated to prevent respective segments from applying opposing torques to the rotor.

The number of segments and/or the angles subtended by the one or more segments of a given electric machine may be selected depending on available package space. In some embodiments an electric machine may be designed to employ as much of the available package space as reasonably possible.

Where a plurality of segments is employed, the segments may advantageously be positioned at selected circumferential locations so as to balance forces associated with motor operation such as magnetic forces between stator and rotor. For example, in the case of an electric machine comprising a pair of segments, the segments may be located at substantially diametrically opposite locations.

One or more fastener elements may be provided to wedge one or more of the segments in a substantially fixed position with respect to a housing and/or axis of rotation of the rotor. This feature has the advantage that it may reduce one or more of noise and vibration associated with machine operation.

FIG. 10 shows a switched reluctance electric machine (SRM) 500 according to a further embodiment of the present invention. Like features of the machine of FIG. 10 to those of the machine of FIG. 9B are shown with like reference numerals incremented by 100.

In the SRM 500 of FIG. 10 the stator 520 is substantially circular. The stator 520 in the embodiment shown has three segments S1, S2, S3 although circular stators 520 with other numbers of segments are also useful such as 2, 4, 5 or more. The segments S1, S2, S3 each subtend an angle of 120° at the axis of rotation R of the rotor 540.

The machine 500 is arranged to operate in a corresponding manner to the machine 100 of FIG. 1 having a non-segmented stator 120.

In the embodiment of FIG. 10, each stator segment S1, S2 S3 has a ring segment tab 520RST similar to that of the segments S1, S2 of the embodiment of FIG. 10(a). A single fastener element 520F is provided between adjacent tabs 520RST of adjacent segments S1, S2, S3. Each fastener element 520F therefore grips respective adjacent pairs of segments S1, S2, S3. Each segment S1, S2, S3 is thereby gripped at both circumferential free ends in a similar manner to that in which the elements 320F of FIG. 10(a) grip a single free end of each segment S1, S2. In order to grip two tabs 520RST by means of one fastener element 520F instead of only one, however, the fastener elements 520F have two hook portions 520FH that protrude in circumferentially opposite directions into respective recesses 520RSR, 520RSR' in the circumferential free ends of the segments S1, S2, S3. In combination with the radially-protruding portion of each element 520F, each fastener element 520F defines a substantially T-shaped fastener element 520F.

The embodiment of FIG. 10 has the advantage that an electric machine 500 having a substantially circular stator may be provided that is composed of respective modular segments. The concept of modular stator segments has the advantage that respective electric machines having different numbers of stator segments may be produced from similar components. A designer of electric machines therefore has at their disposal a further degree of freedom when designing an electric machine to fit in a given component space and to hence provide solutions of varying output power by using an appropriate number of segments.

A permanent magnet synchronous motor (PMSM) 600 according to an embodiment of the present invention is shown in FIG. 11. The PMSM 600 in the present embodiment operates in three (3) phases and comprises a fixed stator 620 and a rotor 640.

The PMSM 600 is installed in a package 150 having the same configuration as described herein with reference to FIG. 1. A shaded area U of the package 150 extends into a central region inset from a radially outer edge of the stator 620. The shaded area U can, for example, represent one or more assemblies or machines, such as a power transfer unit or a starter motor, which impinge on the PMSM 600.

The stator 620 is a segmented stator in accordance with an aspect of the present invention. The stator 620 comprises first and second segments S1, S2 provided at diametrically opposed locations about the rotor 640. The first and second segments S1, S2 each have an arcuate profile and are arranged co-axially with the rotor 640. The angularly offset arrangement of the first and second segments S1, S2 results in the stator 620 having an interrupted or discontinuous circular profile. The first and second segments S1, S2 each have six (6) teeth 622. The angular spacing of the teeth 622 is equivalent to that of a circular stator of equivalent diameter having eighteen (18) teeth which project radially inwardly. A winding 624 is provided around each tooth 622 of the stator 620 to generate a magnetic flux when current is passed therethrough. The winding 624 in the present embodiment is a concentrated winding comprising a separate coil wound on each tooth 622. An electronic controller (not shown) is provided to control the supply of current to the windings 624 to control operation of the PMSM 600.

The rotor 640 is substantially circular and is located coaxially of the stator 620. The rotor 640 is free to rotate within the stator 620. The rotor 640 comprises twelve (12) poles 642 having uniform angular spacing around the rotor 640. The poles 642 can, for example, be made of rare-earth materials to provide a high density of magnetic flux. The poles 642 can each be formed by one or more permanent magnets.

The inventors have determined that the three (3) phase operation of the PMSM 600 is unaffected by the omission of a set of three adjacent teeth 622. Accordingly, the angular offset between the first and second segments S1, S2 corresponds to the angular spacing of three of said teeth 622 of the stator 620. In the present embodiment, the angular spacing of the teeth 622 is 20° and, therefore, the angular offset between the first and second segments S1, S2 is 60°. It will be appreciated that the angular offset may vary for a different angular spacing between the teeth 622. The control sequence for energising the winding 624 on each tooth 622 is the same as for a conventional three (3) phase PMSM. The electronic controller for the PMSM 600 is unchanged from a controller for a conventional PMSM having a circular stator.

The PMSM 600 according to the present embodiment has a stator tooth to rotor pole ratio of 18/12. As described herein, other ratios such as 36/24 or 18/24 may be employed. Furthermore, rather than provide a concentrated winding 624 on the teeth 622, a distributed winding could be provided around the teeth 622. Moreover, the angular offset between the first and second segments S1, S2 may vary in alternate embodiments. In particular, the angular offset between the first and second segments S1, S2 could correspond to less than or more than three of said teeth 622. The angular offset could, for example, correspond to a multiple of the angular spacing of three of said teeth 622 (for example, six (6), nine (9), twelve (12) and so on).

It will be understood that the stator 620 can comprise more than two segments S arranged to balance the forces applied to the rotor 640. The segments S can be arranged within the stator 620 in diametrically opposing positions. By way of example, a stator 620 comprising 36 teeth 622 could be formed from four segments S each having six (6) teeth 622; and an angular spacing equivalent to three (3) teeth 622 provided between adjacent segments S forming the stator 620. A stator 620 comprising 36 teeth 622 could be formed from three segments S each having nine (9) teeth 622; and an angular spacing equivalent to three (3) teeth 622 provided between adjacent segments S forming the stator 620. The resulting forces applied to the rotor 640 are balanced when the PMSM 600 is in operation. The stator 620 having 36 teeth 622 would be combined with a rotor having 24 poles.

A modified arrangement of the PMSM 600 is shown in FIG. 12A and FIG. 12B. Like reference numerals are used for like components.

As shown in FIG. 12A, the modified PMSM 600 is disposed in a non-circular package 150. The PMSM 600 comprises a fixed stator 620 and a rotor 640. The stator 620 comprises first and second segments S1, S2 arranged diametrically opposed to each other. The first and second segments S1, S2 each comprise six (6) radially inwardly directed teeth 622. A winding 624 is provided in the form of a coil on each tooth 622.

The rotor 640 is unchanged from the arrangement illustrated in FIG. 11 and comprises twelve (12) poles 642. A magnetic flux is generated by each pole 642 and this may extend into the package 150 in the region angularly offset from the first and second segments S1, S2. The package 150 can be formed from a conductive material, such as a metal or alloy, which can be exposed to a varying electromagnetic field as the rotor 640 rotates. In use, this can result in electromagnetic induction within the package 150. The shaded area U disposed between the first and second segments S1, S2 is exposed to the largest variations in the electromagnetic field as it is positioned closest to the rotor 640. The resulting electromagnetic induction could, at least in some embodiments, generate an electric current within the package 150 potentially causing heating of the package 150.

To inhibit electromagnetic induction within the package 150, the stator 620 in the present embodiment comprises first and second shield elements 625a, 625b. The shield elements 625a, 625b are arcuate and arranged co-axially with the rotor 640. In the present embodiment, the first and second shield elements 625a, 625b are formed integrally with the first and second segments S1, S2. In particular, the first and second segments S1, S2 and the first and second shield elements 625a, 625b are formed from a single sheet of metal, such as electrical steel, to form a lamination of the stator 620 having a unitary structure. The stator 620 is formed from a stack of said laminations in conventional manner. As shown in FIG. 12B, the shield elements 625a, 625b are profiled to form a uniform air gap (G) between the rotor 640 and the shield 625. The radial position of the shield elements 625a, 625b relative to the rotor 640, and hence the size of the air gap (G), can be varied in different embodiments, as illustrated by the double-headed arrow (A) and arcuate lines shown in phantom in FIG. 12A.

The magnetic flux lines F associated with two adjacent poles 642 of the rotor 640 are illustrated in FIG. 12B. The shield elements 625a, 625b are operative to close the magnetic flux lines and to inhibit (either to reduce or prevent) the magnetic flux extending into the package 150. Electromagnetic induction can thereby be reduced or prevented as the rotor 640 rotates relative to the package 150. It will be appreciated that the shield elements 625a, 625b can help to shield the package 150 from the rotor 640.

Figure 12C:
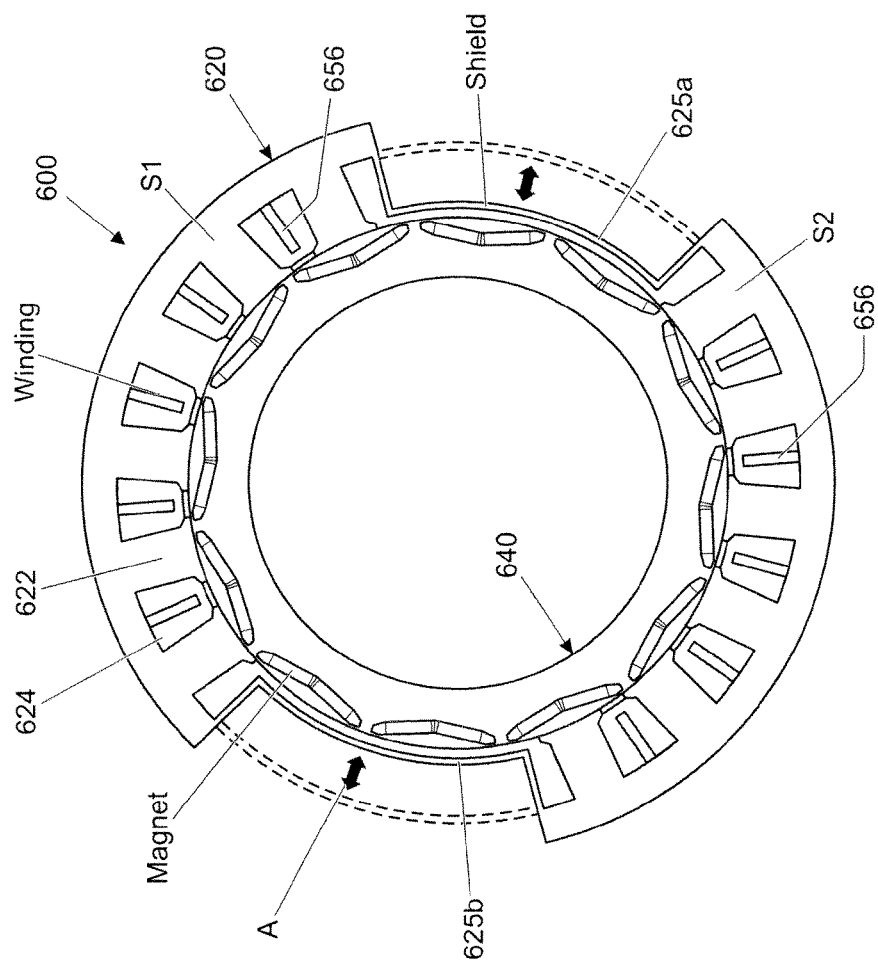
FIG. 12C is a schematic illustration of a modified arrangement of the PMSM shown in FIGS. 12A and 12B incorporating inter-pole shield elements.

A modified arrangement of the PMSM 600 shown in FIGS. 12A and 12B is shown in FIG. 12C. The PMSM 600 in this arrangement incorporates a series of inter-pole shield elements 656 equivalent to the inter-pole shield elements 256 described in relation to the SRM 200 shown in FIG. 7. The inter-pole shield elements 656 are each disposed between adjacent poles of the stator 620 and extend substantially radially inwardly. The inter-pole shield elements 656 are formed integrally with the first and second segments S1, S2. The first shield element 625a and/or the second shield element 625b could optionally be omitted from this arrangement.

The shield elements 625a, 625b in the modified PMSM 600 shown in FIG. 12A and FIG. 12B are formed integrally with the first and second segments S1, S2. A modified arrangement of the PMSM 600 shown in FIG. 12A and FIG. 12B is illustrated in FIG. 13. Like components are again identified with like reference numerals, albeit supplemented with a prime to aid clarity.

The first and second shield elements 625a', 625b' of the modified PMSM 600' are separate inserts which are fixedly mounted between the first and second segments S1', S2'. The first and second shield elements 625a', 625b' each comprise a pair of mounting arms 626 and an arcuate shield 627. The arcuate shield 627 is arranged co-axially to the rotor 640' and an air gap G is maintained between the rotor 640' and the shield elements 625a', 625b'. A pair of shield extensions 630 are formed at each circumferential end of the arcuate shield 627 to provide additional shielding, The mounting arms 626 each co-operate with the first and second segments S1', S2' to mount the first and second shield elements 625a', 625b'. In the illustrated arrangement, the mounting arms 626 each have a projection 628 for locating in a corresponding cut-out 629 formed in each end of the first and second segments S1', S2'. The projections 628 and the cut-outs 629 each have a semi-circular profile in the illustrated arrangement. It will be appreciated that different keyed profiles can be formed on the mounting arms 626 to mount the shield elements 625a', 625b.

The first and second shield elements 625a', 625b' are formed from a sheet material which can be the same material as the first and second segments S1', S2'. Alternatively, the first and second shield elements 625a', 625b' can be formed from a different material. For example, a material having improved magnetic shielding properties could be employed to form the first and second shield elements 625a', 625b'. The first and second shield elements 625a', 625b' can be formed from any material having magnetic shielding properties. For example, the first and second shield elements 625a', 625b' can be formed from electrical steel, copper or mu-metal (i.e. nickel-iron alloys)

The first and second segments S1, S2 each subtend an angle of 120° in the present embodiment; and the first and second shield elements 625a', 625b' each subtend an angle of 60°. This arrangement can advantageously permit modular assembly of a stator 620' according to an aspect of the present invention. For example, the first and second shield elements 625a', 625b' and the first and second segments S1', S2' can be assembled to form the stator 620' illustrated in FIG. 13.

Alternatively, a stator (not shown) having a continuous circular profile can be formed from three like segments S. In this configuration the semi-circular cut-outs 629 align with each other to form circular through holes for receiving fixing rods to secure the segments S within the stator. The segments S could be modified to provide cooperating male and female profiles at respective ends of each segment to facilitate modular assembly of the stator.

The segmented stator described herein can be utilised in different types of electrical machine. For example, the segmented stator could be implemented in a switched reluctance electric machine; an axial flux electric machine; a radial flux electric machine and so on.

Electric machines according to embodiments of the present invention may have any suitable number of stator segments such as 1, 2, 3, 4, 5 or more.

It is to be understood that the amount of available component space for an electric machine may vary according to vehicle model, and in some embodiments according to the options specified by a purchaser. In the event that the model and/or options specified require a reduction in available space for a stator of an electric machine the designer may configure the electric machine to make more full use of the available space by employing stator segments of larger radius of curvature than would be possible with a circular stator. The segments may be similar to those employed in vehicle models or vehicles with options that do not reduce the available stator space, but fewer in number.

Throughout the description and claims of this specification, the words "comprise" and "contain" and variations of the words, for example "comprising" and "comprises", means "including but not limited to", and is not intended to (and does not) exclude other moieties, additives, components, integers or steps.

Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the invention are to be understood to be applicable to any other aspect, embodiment or example described herein unless incompatible therewith.

Further aspects of the present invention are described in the following numbered paragraphs:

1. An electric machine comprising a substantially circular rotor and a stator, wherein the stator comprises at least one substantially arcuate segment.
2. An electric machine as described in paragraph 1 wherein the stator is substantially non-circular.
3. An electric machine as described in paragraph 1 wherein the stator is substantially circular and comprises a plurality of arcuate segments.
4. An electric machine as described in paragraph 1 wherein the stator comprises a pair of diametrically opposed stator segments.
5. An electric machine as described in paragraph 1 wherein the stator comprises only two stator segments.
6. An electric machine as described in paragraph 1 wherein the rotor is provided with R teeth and the at least one stator segment is provided with S teeth where R and S are both integer values greater than 1.
7. An electric machine as described in paragraph 6 wherein S=2P where P is the number of phases of current supplied to operate the machine.
8. An electric machine as described in paragraph 6 wherein R=(2P×360/(segment arc))+2 or wherein R=(2P×360/(segment arc))−2.
9. An electric machine as described in paragraph 1 comprising a plurality of segments and configured wherein in use magnetic flux paths generated in one stator segment are substantially self-contained within that segment and not shared between segments.
10. An electric machine as described in paragraph 1 configured wherein in use magnetic flux paths passing from a segment to the rotor pass substantially through segment teeth and not through circumferentially opposed free ends of the segment.
11. An electric machine as described in paragraph 1 wherein the at least one segment comprises at least one tab portion at at least one circumferential free end thereof, the tab portion protruding circumferentially away from a ring portion of the segment from which stator teeth protrude radially inwardly.
12. An electric machine as described in paragraph 1 wherein the at least one tab portion is provided with at least one bore therein to accommodate a fixing element e.g. a screw or bolt.
13. An electric machine as described in paragraph 1 comprising a hooked fixing element arranged to grip a radially inner surface of a segment and to prevent the segment from moving radially inwardly.
14. An electric machine as described in paragraph 1 comprising a hooked fixing element arranged to key into a corresponding formation provided in a circumferential free end of a segment thereby to prevent the segment from moving radially inwardly.
15. An electric machine as described in paragraph 1, wherein the circular rotor comprises a plurality of permanent magnets.
16. An electric machine as described in paragraph 15, wherein the stator comprises one or more shield elements disposed between adjacent arcuate segments.

17. An electric machine as described in paragraph 16, wherein each shield element extends circumferentially between said adjacent arcuate segments.
18. An electric machine as described in paragraph 16, wherein said one or more shield elements are formed integrally with said adjacent arcuate segments.
19. An electric machine as described in paragraph 18, wherein said arcuate segments and said one or more shield elements are formed from a sheet material, such as electrical steel.
20. An electric machine as described in paragraph 16, wherein said one or more shield elements are formed independently of said arcuate segments and mounted between said adjacent arcuate segments.
21. A motor vehicle component comprising an electric machine as described in paragraph 1.
22. A component as described in paragraph 21 wherein the component comprises a portion of a driveline, optionally a transmission.
23. A motor vehicle comprising an electric machine as described in paragraph 1 or a component as described in paragraph 21.
24. A method of fabricating an electric machine comprising providing a substantially circular rotor and a stator comprising at least one substantially arcuate segment.
25. A method as described in paragraph 24 comprising causing rotation of the rotor by application of a magnetic field to one or more teeth of the stator.
26. A method as described in paragraph 24 whereby a portion of the segment facing the rotor has a radius of curvature corresponding to that of the rotor.
27. An arcuate segment for forming a portion of a stator of an electric machine, the arcuate segment comprising one or more radially inwardly directed teeth.
28. An arcuate segment as described in paragraph 27 configured to be coupled to a like arcuate segment and/or a shield element.
29. A stator for an electrical machine comprising at least one of said arcuate segments as described in paragraph 27; and/or at least one of said shield elements as described in paragraph 28.
30. A shield element for providing magnetic shielding of an electric machine rotor, the shield element comprising coupling means for coupling the shield element to one or more adjacent arcuate segments.
31. An electric machine comprising a rotor and a stator, wherein the stator is non-circular and comprises:
a plurality of teeth; and
a plurality of inter-pole shields;
wherein each of said inter-pole shields is disposed between adjacent teeth of said stator.
32. An electric machine as described in paragraph 31, wherein said inter-pole shield substantially bisects an aperture formed between said adjacent teeth.
33. An electric machine as described in paragraph 31, wherein a winding is disposed on each of said teeth and each inter-pole shield locates between the windings on adjacent teeth.
34. An electric machine as described in paragraph 31, wherein said stator comprises at least one arcuate segment and said inter-pole shields extend radially inwardly from said at least one arcuate segment.
35. An electric machine as described in paragraph 34, wherein said inter-pole shields have a radial length which is less than the radial length of said teeth.
36. An electric machine as described in paragraph 34, wherein each arcuate segment is formed from a plurality of like sheet members disposed on top of each other; and said teeth and said inter-pole shields are defined by said sheet members.
37. An electric machine as described in paragraph 34, wherein said at least one arcuate segment comprises a first shield disposed at a first circumferential end and/or a second shield disposed at a second circumferential end.
38. An electric machine as described in paragraph 34 comprising a plurality of said arcuate segments spaced apart from each other in said stator.
39. An electric machine as described in paragraph 31, wherein said inter-pole shields have a circumferential width which is less than a circumferential width of said teeth.
40. A stator segment for forming a portion of a stator of an electric machine, the stator segment comprising:
a plurality of teeth; and
at least one inter-pole shield;
wherein each inter-pole shield is disposed between the adjacent teeth of said stator segment.
41. A stator segment as described in paragraph 40, wherein said inter-pole shield substantially bisects an aperture formed between said adjacent teeth.
42. A stator segment as described in paragraph 40, wherein said stator segment is in the form of an arcuate segment and said at least one inter-pole shield extends radially inwardly from said arcuate segment.
43. A stator segment as described in paragraph 42, wherein said arcuate segment comprises a first shield disposed at a first circumferential end and/or a second shield disposed at a second circumferential end.
44. An electric machine comprising one or more stator segments as described in paragraph 40.
45. A motor vehicle comprising an electric machine as described in paragraph 31.
46. An electric machine comprising a rotor and a stator, the stator comprising a plurality of substantially arcuate segments, each arcuate segment having first and second circumferential ends;
wherein each arcuate segment comprises:
one or more teeth; and
a first shield disposed at said first circumferential end and/or a second shield disposed at said second circumferential end.
47. An electric machine as described in paragraph 46, wherein a first sector angle is defined between the first shield and a centre line of the tooth located adjacent to said first shield; and a second sector angle is defined between the second shield and a centre line of the tooth located adjacent to said second shield; the sum of said first and second sector angles being substantially equal to a pole pitch of the teeth in said stator.
48. An electric machine as described in paragraph 47 wherein said first sector angle is the same as said second sector angle.
49. An electric machine as described in paragraph 46, wherein said first shield extends radially; and/or said second shield extends radially; the radial extent of said first shield and/or said second shield being less than the radial extent of said one or more teeth.
50. An electric machine as described in paragraph 46, wherein said first shield has a first width in a circumferential direction; and/or said second shield has a second width in a circumferential direction.
51. An electric machine as described in paragraph 50, wherein said one or more teeth each extend radially inwardly and have a third width in a circumferential direction, said third width being greater than said first width and/or said second width. 52. An electric machine as described in paragraph 46, wherein each arcuate segment is formed from a plurality of like sheet members disposed on top of each other.
53. An electric machine as described in paragraph 52, wherein said sheet members define said first shield and/or said second shield.
54. An electric machine as described in paragraph 46, wherein said arcuate segments are spaced apart from each other in said stator.
55. An electric machine as described in paragraph 46, wherein said arcuate segments are arranged side by side and interlock with each other.
56. An electric machine as described in paragraph 46, wherein first and second connectors are disposed at said first and second circumferential ends of said arcuate segment respectively, said first and second connectors being adapted to interlock with like arcuate segments.
57. An electric machine as described in paragraph 56, wherein said first and second connectors are arranged to inhibit radial movement of said arcuate segment.
58. A motor vehicle component comprising an electric machine as described in paragraph 46.
59. A stator segment for forming a portion of a stator of an electric machine, the stator segment being substantially arcuate and having one or more teeth;
   said stator segment comprising a first shield disposed at a first circumferential end; and a second shield disposed at a second circumferential end;
   wherein a first sector angle is defined between the first shield and a centre line of the tooth located adjacent to said first shield; and a second sector angle is defined between the second shield and a centre line of the tooth located adjacent to said second shield; the sum of said first and second sector angles being substantially equal to a pole pitch of the teeth in said stator.
60. A stator segment as described in paragraph 59, wherein said first sector angle is the same as said second sector angle.
61. A stator segment as described in paragraph 59, said first shield having a first width in a circumferential direction; and said second shield having a second width in a circumferential direction; wherein said one or more teeth each have a third width in a circumferential direction; said third width being greater than said first width and/or said second width.
62. An electric machine comprising one or more stator segments as described in paragraph 59.
63. A motor vehicle comprising an electric machine as described in paragraph 62.
64. A stator segment for forming a portion of a stator of an electric machine, the stator segment comprising:
   a ring segment having first and second circumferential ends;
   one or more radially inwardly directed teeth; and
   a protuberance disposed between said first and second circumferential ends of the ring segment, the protuberance extending radially outwardly.
65. A stator segment as described in paragraph 64, wherein said protuberance is disposed at or proximate to a midpoint of said ring segment.
66. A stator segment as described in paragraph 64 wherein said protuberance is convex in plan form.
67. A stator segment as described in paragraph 64, wherein said protuberance extends substantially parallel to a longitudinal axis of the stator segment.
68. A stator segment as described in paragraph 64, wherein said protuberance is integrally formed with said ring segment.
69. A stator segment as described in paragraph 64, wherein said stator segment is formed from a plurality of sheet members disposed on top of each other.
70. A stator segment as described in paragraph 69, wherein said protuberance is defined by some or all of said sheet members.
71. A stator segment as described in paragraph 64, wherein said protuberance is mounted to said ring segment.
72. A stator segment as described in paragraph 64 comprising a plurality of said protuberances.
73. An electric machine comprising one or more stator segments as described in paragraph 64.
74. An electric machine as described in paragraph 73, wherein said electric machine is a switched reluctance electric machine or a permanent magnet synchronous machine.
75. A stator for an electric machine, the stator comprising:
   a ring section;
   one or more radially inwardly directed teeth disposed on said ring section; and
   at least one radially outwardly extending protuberance disposed on said ring section.
76. A stator as described in paragraph 75 comprising a plurality of said protuberances, the protuberances being disposed around the circumference of said ring section.
77. A stator as described in paragraph 76, wherein said protuberances are evenly spaced around the circumference of said ring section.
78. An electric machine comprising a stator as described in paragraph 75.
79. A vehicle comprising an electric machine as described in paragraph 78.

The invention claimed is:
1. An electric machine comprising a circular rotor, a stator, and a housing,
   wherein the stator is non-circular and comprises at least one ring segment between a first circumferential free end and a second circumferential free end, the first and second circumferential free ends each being a free end of the ring segment with respect to a circumferential direction,
   the electric machine comprising a hooked fixing element protruding radially inwardly from an internal wall of the housing, the hooked fixing element being arranged either:
   to grip a radially inner surface of a tab portion of the at least one ring segment, the tab portion being located at the first circumferential free end; or
   to key into a corresponding formation provided in the first circumferential free end, thereby to prevent the at least one ring segment from moving radially inwardly relative to the internal wall of the housing.
2. An electric machine as claimed in claim 1 wherein the stator is circular and wherein the at least one ring segment comprises a plurality of ring segments.
3. An electric machine as claimed in claim 1, wherein the stator comprises a pair of diametrically opposed ring segments.
4. An electric machine as claimed in claim 1, wherein the rotor is provided with R teeth and the at least one ring segment is provided with S teeth where R and S are both integer values greater than 1.

5. An electric machine as claimed in claim 4, wherein S=2P where P is the number of phases of current supplied to operate the machine.

6. An electric machine as claimed in claim 4, wherein R=(2P×360/(segment arc))+2 or wherein R=(2P×360/(segment arc))−2,
where P is the number of phases of current supplied to operate the machine.

7. An electric machine as claimed in claim 1, wherein the at least one tab portion protrudes circumferentially away from a ring portion of the at least one ring segment from which stator teeth protrude radially inwardly.

8. An electric machine as claimed in claim 7, wherein the at least one tab portion is provided with at least one bore therein to accommodate the fixing element.

9. An electric machine as claimed in claim 1, wherein the circular rotor comprises a plurality of permanent magnets.

10. An electric machine as claimed in claim 9, wherein the at least one ring segment comprises a plurality of ring segments, and wherein the stator comprises one or more shield elements disposed between adjacent ones of the plurality of ring segments.

11. An electric machine as claimed in claim 10, wherein each shield element extends circumferentially between said adjacent ring segments.

12. An electric machine as claimed in claim 10, wherein said one or more shield elements are formed integrally with said adjacent ring segments.

13. An electric machine as claimed in claim 12, wherein said ring segments and said one or more shield elements are formed from a sheet material.

14. An electric machine as claimed in claim 10, wherein said one or more shield elements are formed independently of said ring segments and mounted between said adjacent ring segments.

15. A motor vehicle component comprising an electric machine as claimed in claim 1.

16. A component as claimed in claim 15, wherein the component comprises a portion of a driveline.

17. A motor vehicle comprising an electric machine as claimed in claim 1.

18. An electric machine as claimed in claim 1, wherein the internal wall of the housing comprises a portion that protrudes radially inwardly, wherein the second circumferential free end is arranged to abut the portion of the internal wall that protrudes radially inwardly.

* * * * *